(12) United States Patent
Yasuda

(10) Patent No.: US 10,712,998 B2
(45) Date of Patent: Jul. 14, 2020

(54) INFORMATION PROCESSING DEVICE, INFORMATION PROCESSING METHOD, AND PROGRAM

(71) Applicant: SONY CORPORATION, Tokyo (JP)

(72) Inventor: Ryouhei Yasuda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/759,628

(22) PCT Filed: Jun. 30, 2016

(86) PCT No.: PCT/JP2016/069372
§ 371 (c)(1),
(2) Date: Mar. 13, 2018

(87) PCT Pub. No.: WO2017/056604
PCT Pub. Date: Apr. 6, 2017

(65) Prior Publication Data
US 2018/0260187 A1  Sep. 13, 2018

(30) Foreign Application Priority Data
Sep. 29, 2015  (JP) ................................. 2015-191485

(51) Int. Cl.
H04R 29/00 (2006.01)
H03G 3/32 (2006.01)
H04R 5/033 (2006.01)
G06F 3/16 (2006.01)
H04M 11/06 (2006.01)
H04S 7/00 (2006.01)
(Continued)

(52) U.S. Cl.
CPC .............. *G06F 3/165* (2013.01); *G06F 3/167* (2013.01); *H04M 11/06* (2013.01); *H04R 1/1083* (2013.01); *H04S 7/304* (2013.01); *H04R 3/005* (2013.01); *H04R 5/033* (2013.01); *H04R 2460/07* (2013.01); *H04S 2400/15* (2013.01); *H04S 2420/01* (2013.01)

(58) Field of Classification Search
CPC .... H04R 2430/20; H04R 1/1016; G10L 25/78
USPC ........................ 381/56–57, 312, 74, 104, 110
See application file for complete search history.

(56) References Cited

U.S. PATENT DOCUMENTS 8,874,448 B1 * 10/2014 Kauffmann ............. G10L 25/78
704/278
9,075,435 B1 * 7/2015 Noble ...................... G06F 3/013
(Continued)

*Primary Examiner* — George C Monikang
(74) *Attorney, Agent, or Firm* — Paratus Law Group, PLLC

(57) ABSTRACT

There is provided an information processing device to improve communication between a user and a person speaking to the user by specifying speaking motion information indicating a motion of a surrounding person speaking to the user for whom information from the surroundings is auditorily or visually restricted, the information processing device including: a detecting unit configured to detect a speaking motion of a surrounding person speaking to a user using a device that auditorily or visually restricts information from surroundings; and a specifying unit configured to specify speaking motion information indicating the speaking motion on a basis of monitored surrounding information in a case in which the speaking motion is detected.

24 Claims, 18 Drawing Sheets

(51) Int. Cl.
*H04R 1/10* (2006.01)
*H04R 3/00* (2006.01)

(56) References Cited

U.S. PATENT DOCUMENTS

| | | | |
|---|---|---|---|
| 2013/0195285 A1* | 8/2013 | De La Fuente | G01S 5/18 381/92 |
| 2014/0233774 A1* | 8/2014 | Kim | H04R 25/554 381/315 |
| 2014/0270200 A1* | 9/2014 | Usher | H04R 1/1041 381/57 |
| 2014/0334682 A1* | 11/2014 | Lee | G10L 17/02 382/103 |
| 2015/0036856 A1* | 2/2015 | Pruthi | G06F 3/04842 381/317 |
| 2016/0163303 A1* | 6/2016 | Benattar | G10K 11/175 381/71.11 |

\* cited by examiner

FIG. 5
| DATE AND TIME DATA | 2015.07.01. 15:03 |
|---|---|
| IMAGE DATA OR MOVING IMAGE DATA | 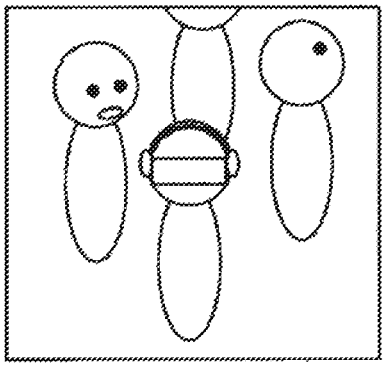 |
| SOUND DATA | 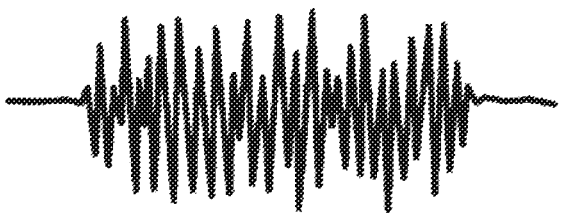 |
| VOICE RECOGNITION DATA | MR. OO, DO YOU HAVE A SECOND? |
| POSITION DATA | RIGHT REAR |
| PERSON ATTRIBUTE DATA | ID:0123456789  O YAMA  □ ROU |
| USED CONTENT | MOVIE "OOO" |

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2016/069372 (filed on Jun. 30, 2016) under 35 U.S.C. § 371, which claims priority to Japanese Patent Application No. 2015-191485 (filed on Sep. 29, 2015), which are all hereby incorporated by reference in their entirety.

TECHNICAL FIELD

The present disclosure relates to an information processing device, an information processing method, and a program.

BACKGROUND ART

In recent years, headphone devices or earphone devices with a noise cancellation function or head mounted display (HMD) devices have become widespread. For users who use such devices, information from the surroundings is auditorily or visually blocked, and thus a sense of immersion is easily experienced. On the other hand, a user using such a device can enjoy a sense of immersion but is unable to easily understand that surrounding people say.

In this regard, a technique of determining a degree of necessity of notifying a user of external information on the basis of external information indicating an external situation of the user and switching a state of notifying the user of the external information on the basis of the determined degree of necessity is disclosed in Patent Literature 1. According to such a technique, a user wearing a shielding type HMD device can communicate with an outside person more smoothly.

CITATION LIST

Patent Literature

Patent Literature 1: WO 2014/156388

DISCLOSURE OF INVENTION

Technical Problem

However, according to the technique disclosed in Patent Literature 1, external image information or sound information is displayed or output to the user in accordance with the degree of necessity of notifying the user of the external information, but the image information or the sound information is not displayed or output from a time point at which the user is spoken to. A surrounding person may face in a different direction than a direction in which the user is located or leave the user after speaking to the user once. In this case, although the external image information or sound information is displayed or output, the user may be unable to notice a person who speaks. However, if it is possible to specify a behavior of the person speaking when a surrounding person speaks to the user, communication between the user and the person speaking to the user is expected to be further improved.

In this regard, the present disclosure proposes an information processing device, an information processing method, and a program which are novel and improved and capable of improving communication between a user and a person speaking to the user by specifying speaking motion information indicating a motion of a surrounding person speaking to the user for whom information from the surroundings is auditorily or visually restricted.

Solution to Problem

According to the present disclosure, there is provided an information processing device including: a detecting unit configured to detect a speaking motion of a surrounding person speaking to a user using a device that auditorily or visually restricts information from surroundings; and a specifying unit configured to specify speaking motion information indicating the speaking motion on a basis of monitored surrounding information in a case in which the speaking motion is detected.

In addition, according to the present disclosure, there is provided an information processing method including: detecting a speaking motion of a surrounding person speaking to a user using a device that auditorily or visually restricts information from surroundings; and specifying speaking motion information indicating the speaking motion on a basis of monitored surrounding information in a case in which the speaking motion is detected.

In addition, according to the present disclosure, there is provided a program causing a computer to execute: a function of detecting a speaking motion of a surrounding person speaking to a user using a device that auditorily or visually restricts information from surroundings; and a function of specifying speaking motion information indicating the speaking motion on a basis of monitored surrounding information in a case in which the speaking motion is detected.

Advantageous Effects of Invention

As described above, in accordance with the present disclosure, it is possible to improve communication between a user and a person speaking to the user by specifying speaking motion information indicating a motion of a surrounding person speaking to the user for whom information from the surroundings is auditorily or visually restricted.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a diagram illustrating a list of speaking motion information specified by a specifying unit.

MODE(S) FOR CARRYING OUT THE INVENTION

Figure 1:
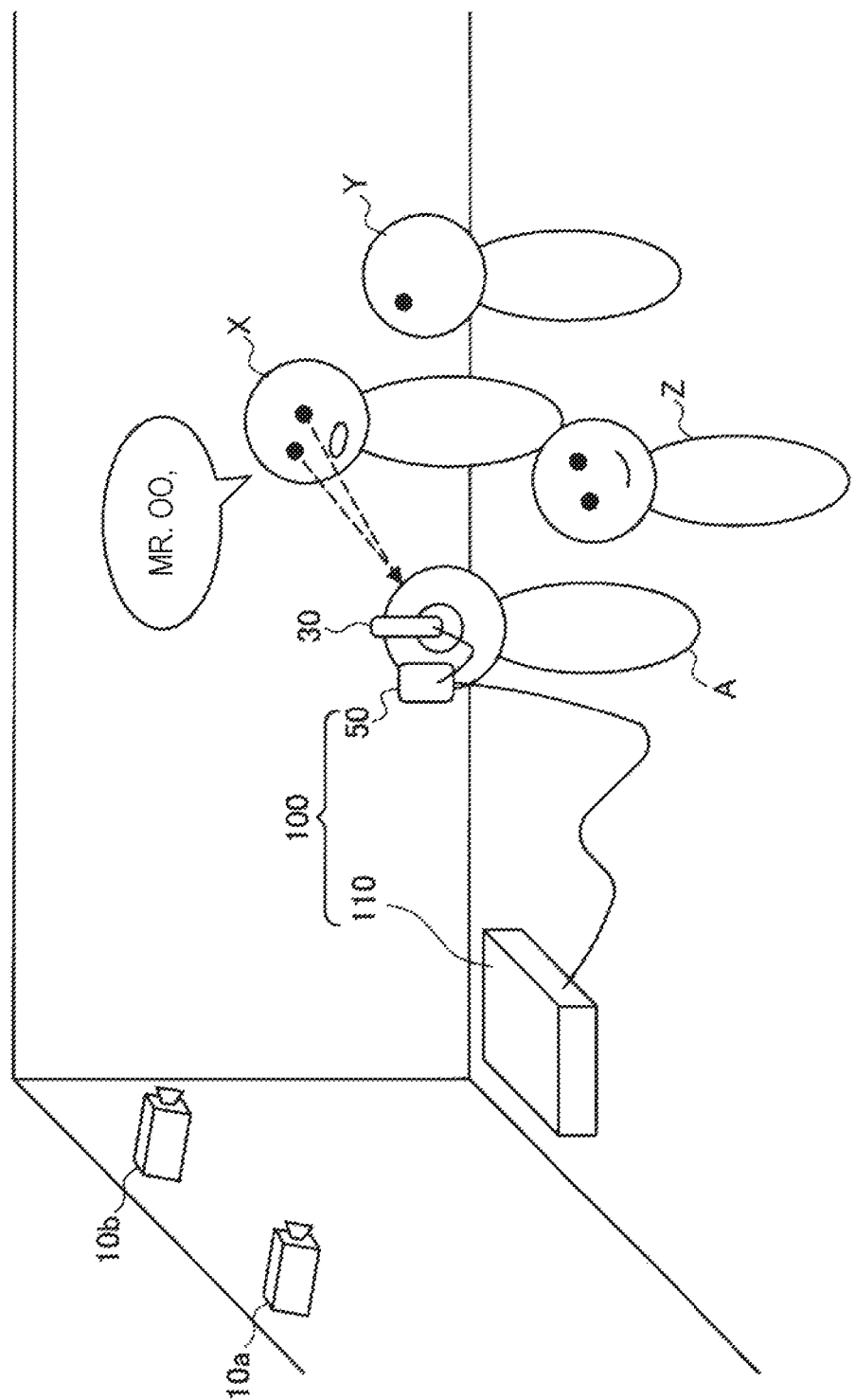
FIG. 1 is an explanatory diagram illustrating a use state of an information processing system according to a first embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, the description will proceed in the following order.
1. First embodiment
1-1. Overview of information processing system
1-2. Configuration of information processing system
1-3. Information processing device
1-4. Process performed by device
1-5. Conclusion of first embodiment
1-6. Modified examples
2. Second embodiment
3. Third embodiment

1. First Embodiment

1-1. OVERVIEW OF INFORMATION PROCESSING SYSTEM

First, an overall overview of an information processing system including an information processing device 110 according to the first embodiment of the present disclosure will be described. FIG. 1 is an explanatory diagram illustrating a use state of an information processing system according to the present embodiment. In the information processing system, an image and a sound of a space in which a user A wearing a device that auditorily or visually restricts information from the surroundings (hereinafter also referred to as an "immersive sensory device") is located are monitored using imaging units 10a and 10b and a sound collecting unit (not illustrated). Here, an HMD device 100 and a headphone device 30 with a noise cancellation function are illustrated as the immersive sensory device.

Further, for example, in a case in which a motion of a surrounding person X speaking to the user A is detected, the information processing device 110 of the HMD device 100 specifies information indicating the speaking motion (hereinafter referred to as "speaking motion information") on the basis of image information and sound information which are being monitored. Then, the information processing device 110 controls at least one of the HMD device 100 and the headphone device 30 on the basis of the specified speaking motion information such that a notification indicating that the surrounding person is speaking to the user A is given. Accordingly, the user A who is having an immersion experience can recognize the speaking motion from the surrounding person.

Further, hereinafter, an image around the user A captured by an imaging device or the like is also referred to as a "surrounding image," and a sound around the user A collected by a sound collecting unit or the like is also referred to as "surrounding sound." Further, the "speaking motion information" which is the information indicating the speaking motion is detected by various kinds of devices installed in a space in which the user A is located and indicates information including a motion or an utterance when a person X, Y, or Z near the user A is speaking to the user A among information acquirable by the information processing device 110.

1-2. CONFIGURATION OF INFORMATION PROCESSING SYSTEM

Figure 2:
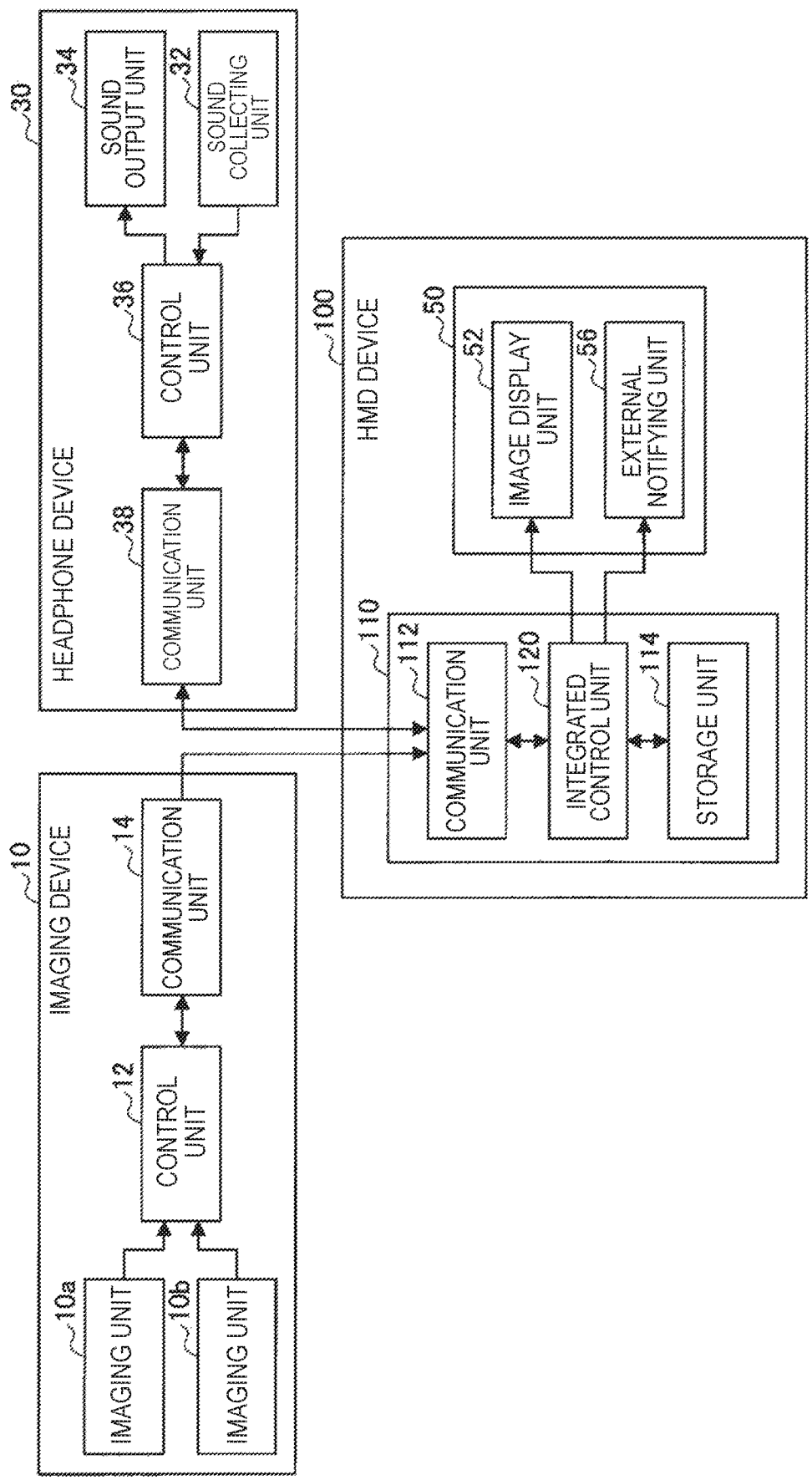
FIG. 2 is a functional block diagram illustrating an example of a configuration of the information processing system according to the embodiment.

Next, an example of a configuration of the information processing system according to the present embodiment will be described. FIG. 2 is a functional block diagram illustrating an example of the configuration of the information processing system. The information processing system according to the present embodiment includes an imaging device 10, the headphone device 30, and the HMD device 100.

1-2-1. Imaging Device

The imaging device 10 includes the imaging units 10a and 10b, a control unit 12, and a communication unit 14, and monitors an area around the user A wearing the immersive sensory device. The communication unit 14 communicates with the information processing device 110 of the HMD device 100. Specifically, the communication unit 14 transmits line-of-sight information provided from the control unit 12 to the information processing device 110. The information processing device 110 uses the line-of-sight information to determine whether or not there is any person facing in a direction of the user A near the user A.

The control unit 12 controls the operation of the imaging device 10. Specifically, the control unit 12 instructs the imaging units 10a and 10b to capture images at preset time intervals, and generates the line-of-sight information on the basis of surrounding image information which is information of the surrounding image obtained by the imaging of the imaging units 10a and 10b. Then, the control unit 12 causes the communication unit 14 to transmit the generated line-of-sight information to the information processing device 110 along with the surrounding image information. For example, the control unit 12 detects the line of sight of a person by analyzing a person included in the surrounding image provided from the imaging units 10a and 10b, and generates the line-of-sight information indicating the detected line of sight. Further, in order to detect the line of sight, for example, a general technique such as a line-of-sight detection technique based on a position of an iris or a pupil or movement of a head of a human body or the like is used.

The imaging units 10a and 10b perform imaging on the basis of an instruction from the control unit 12. Specifically, the imaging units 10a and 10b image the area around the user A in a format of a moving image or a still image, and provide a surrounding image obtained by the imaging to the control unit 12. For example, the imaging units 10a and 10b may include an imaging optical system such as a photographing lens and a zoom lens that collect light and a signal conversion element such as charge coupled device (CCD) or complementary metal oxide semiconductor (CMOS). Further, the imaging units 10a and 10b may be infrared (IR) cameras or may be a combination of a visible light camera and an IR camera.

The information processing system of the present embodiment includes the two imaging units 10a and 10b, but the number of imaging units is not limited to two. A single imaging unit may be used, or two or more imaging units may be used. Further, the imaging units 10a and 10b may be fixed on a wall or the like or may be of a mobile type. In this case, a mobile type imaging unit may include a camera worn on the head or the like of the user A or the surrounding person X, Y or Z.

Further, the control unit 12 may detect a face direction instead of the line of sight of the person X, Y, or Z near the user A on the basis of the surrounding image information obtained by the imaging units 10a and 10b and transmit the face direction information to the information processing device 110 together with the surrounding image information. In order to detect the face direction, for example, a general technique such as a face direction detection technique based on feature points of constituent elements of the face is used.

1-2-2. Immersive Sensory Device

The HMD device 100 serving as the immersive sensory device displays various kinds of visual information in front of the eyes of the user A in a state in which information from the surroundings is visually restricted for to the user A wearing a display device 50 having a goggle-like shape. At the same time, the user A can have an immersion experience by wearing the headphone device 30 and watching content sound which is sound of provided content in a state in which information from the surroundings is auditorily restricted. The HMD device 100 includes the display device 50 and the information processing device 110.

The display device 50 includes an image display unit 52 which is positioned inside the goggle-like shape and faces the face side of the user A and an external notifying unit 56 which is positioned outside the goggle-like shape and faces an opposite side to the face of the user A. For example, the image display unit 52 is controlled by the information processing device 110, includes two display screens which are installed at positions corresponding to the right eye and the left eye of the user A, and is able to provide a three-dimensional image (3D image) to the user A.

The user A can enjoy a content image which is an image of content such as a movie or a video game with reference to the display screen of the image display unit 52. Further, in a case in which the motion of the person near the user A speaking to the user A is detected, the image display unit 52 displays a notification to be given to the user A. Further, the image display unit 52 may include a single display screen.

The external notifying unit 56 presents information to the person near the user A. The external notifying unit 56 is not limited to the display of the image information and may present information to surrounding persons depending on a lighting state of an illumination light such as a light emitting diode (LED). Further, in the system of the present embodiment, the display device 50 of the HMD device 100 may not include the external notifying unit 56.

The information processing device 110 integrally controls the HMD device 100 and the headphone device 30 connected to the HMD device 100. The information processing device 110 includes a communication unit 112, a storage unit 114, and an integrated control unit 120.

The communication unit 112 communicates with the imaging device 10, the display device 50, and the headphone device 30. Specifically, the communication unit 112 receives the line-of-sight information and the surrounding image information from the imaging device 10, and receives the surrounding sound information which is information of the surrounding sound from the headphone device 30. The surrounding image information and the surrounding sound information are examples of the surrounding information for monitoring the space in which the user A is located. Further, the communication unit 112 transmits the image information or a driving signal to the display device 50, and transmits the sound information to the headphone device 30. The communication performed by the communication unit 112 may be wired communication or wireless communication.

The storage unit 114 stores information related to a control process of the integrated control unit 120. Specifically, the storage unit 114 stores the received line-of-sight information, the surrounding image information, the surrounding sound information, the image information to be displayed on the display device 50, and the like. The storage unit 114 may be a storage element such as, for example, a random access memory (RAM). Further, the information processing device 110 may include a storage device (not illustrated) which stores a software program executed by the integrated control unit 120, parameters used for various kinds of control processes, or the like or data of various content to be provided to the user A.

The integrated control unit 120 performs a process of detecting the motion of the person near the user A speaking to the user A on the basis of the received line-of-sight information, the surrounding image information, or the surrounding sound information. Further, in a case in which the motion of speaking to the user A is detected, the integrated control unit 120 specifies the speaking motion information on the basis of the monitored surrounding information and performs various kinds of processes of giving a notification indicating that the user A is spoken to to the user A. A specific functional configuration of the integrated control unit 120 will be described later.

1-2-3. Headphone Device

A headphone device 30 serving as the immersive sensory device is connected to the HMD device 100 and outputs an operation sound of the HMD device 100 or a content sound which is a sound associated with provided content. The headphone device 30 may have a noise cancellation function. A device that outputs a sound is not limited to the headphone device 30 and may be, for example, an earphone device. The headphone device 30 includes a sound output unit 34, a sound collecting unit 32, a control unit 36, and a communication unit 38.

The communication unit 38 communicates with the information processing device 110 of the HMD device 100. Specifically, the communication unit 38 receives the sound information such as the content sound or the operation sound provided from the information processing device 110. Further, the communication unit 38 transmits the surrounding sound information collected by the sound collecting unit 32 to the information processing device 110. The surrounding sound information is used in the information processing device 110 to determine whether or not a surrounding person is speaking to the user A.

The sound output unit 34 is controlled by the control unit 36, and outputs the content sound, the operation sound, or the like. Further, in a case in which the motion of the person near the user A speaking to the user A is detected, the sound output unit 34 gives a sound notification to the user A. The sound collecting unit 32 collects sound for monitoring the area around the user A and provides a surrounding sound signal to the control unit 36. The sound collecting unit 32 may include, for example, at least two microphones and be installed in speaker boxes corresponding to both ears, a head band, or the like. It is possible to collect surrounding sound with a plurality of microphones and estimate a position of a sound source by a sound source localization process.

The control unit 36 causes the communication unit 38 to transmit the surrounding sound signal to the information processing device 110. Further, the control unit 36 causes the sound output unit 34 to output sound on the basis of the information of the content sound or the operation sound transmitted from the information processing device 110. For example, while the content sound is being output, the control unit 36 executes noise cancellation control such that it is difficult for the user A to hear the surrounding sound. For example, the control unit 36 may invert a wavelength of surrounding sound collected by the sound collecting unit 32 with respect to a wavelength corresponding to the sound information transmitted from the information processing device 110, cause the wavelengths to be superimposed, and cause a resulting sound to be output from the sound output unit 34. Accordingly, it is difficult for the user A to hear the surrounding sound, and it is easy for the user A to have a sense of immersion.

Further, in the present embodiment, the sound collecting unit 32 is a component of the headphone device 30, but the sound collecting unit 32 may be installed in the display device 50 of the HMD device 100. Alternatively, the sound collecting unit 32 may be directly connected to the information processing device 110 as a device independent of the HMD device 100 or the headphone device 30. Further, the control unit 36 of the headphone device 30 may be omitted, and the information processing device 110 of the HMD device 100 may have the function of the control unit 36.

Further, the external notifying unit 56 installed in the display device 50 of the HMD device 100 may be installed in the headphone device 30. Alternatively, in addition to the external notifying unit 56 of the display device 50 of the HMD device 100, an external notifying unit may be installed in the headphone device 30. In a case in which the external notifying unit is installed in the headphone device 30, for example, an external notifying unit may be installed on outer surfaces of the speaker boxes corresponding to the left and right ears or in the headband connecting the speaker boxes.

1-3. INFORMATION PROCESSING DEVICE

Figure 3:
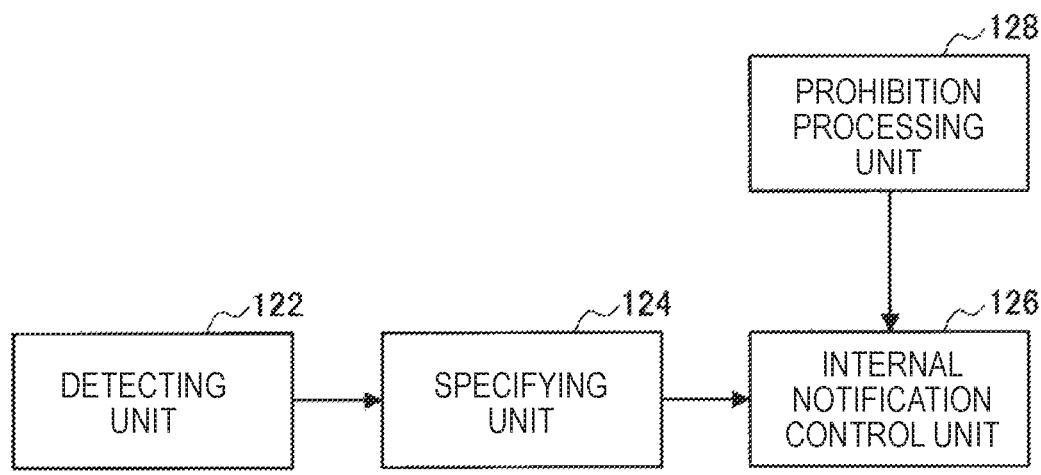
FIG. 3 is a functional block diagram illustrating an example of a configuration of an integrated control unit of an information processing device according to the embodiment.

Next, a specific configuration example of the information processing device 110 will be described in detail. FIG. 3 is a functional block diagram illustrating an example of a configuration of the integrated control unit 120 of the information processing device 110. In the information processing device 110, the integrated control unit 120 includes a detecting unit 122, a specifying unit 124, an internal notification control unit 126, and a prohibition processing unit 128. Specifically, the units are functional units implemented when the software program is executed by the CPU.

1-3-1. Detecting Unit

The detecting unit 122 detects the motion of the person near the user A speaking to the user A on the basis of the line-of-sight information, the surrounding image information, or the surrounding sound information. Specifically, the detecting unit 122 may detect that the user A is spoken to in a case in which a surrounding person is determined to speak while facing in the direction of the user A. For example, in a case in which the user A is located in a field-of-view range of the person X decided on the basis of the received line-of-sight information, the detecting unit 122 may determine that the surrounding person X is looking at the user A. In a case in which the person X is determined to be looking at the user A, the detecting unit 122 may cause the storage unit 114 to start recording the received image information and the sound information. Further, the detecting unit 122 may determine that the person X speaks in a case in which a sound level of the surrounding sound collected from the direction of the person X looking at the user A is equal to or higher than a predetermined level.

Figure 4:
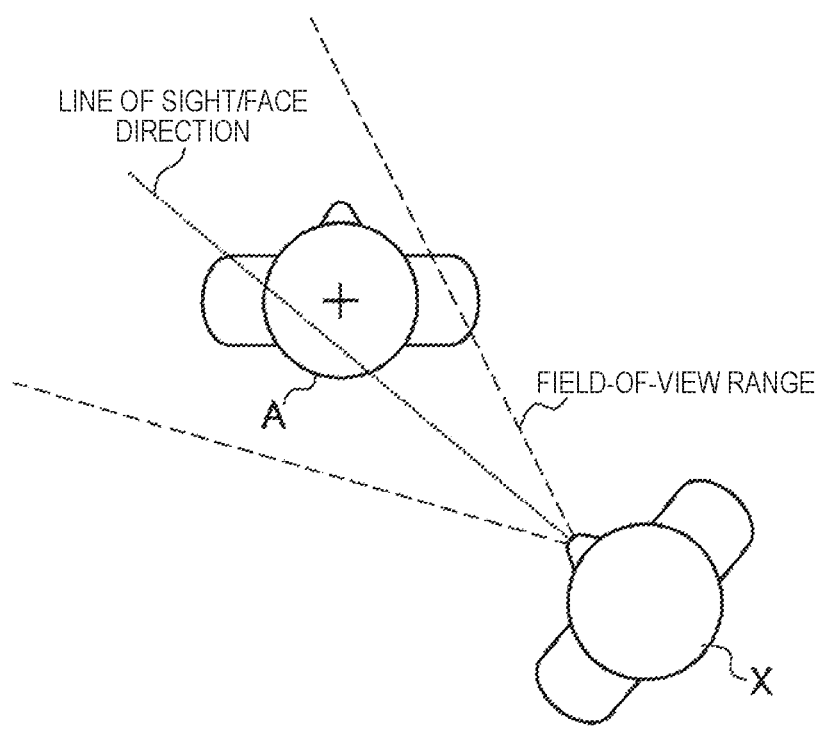
FIG. 4 is an explanatory diagram illustrating an example of a method of determining whether or not a person is looking at the user.

FIG. 4 is an explanatory diagram illustrating an example of a method for determining whether or not the person X is looking at the user A. In the example illustrated in FIG. 4, the field-of-view range is decided on the basis of a line-of-sight direction of the person X, and it is determined whether or not the user A is located within the field-of-view range. The field-of-view range may be a range decided by rotating the detected line-of-sight direction in both right and left directions at an appropriate angle centering on a position between the eyes of the person X. An angle θ formed by such a field-of-view range may be, for example, 45° but is not limited thereto. Further, the field-of-view range may be limited in accordance with a distance from the person X. A position of the user A may be specified on the basis of, for example, information detected by a GPS sensor installed in the display device 50 of the HMD device 100.

At this time, in a case in which the likelihood that the person X is looking at the user A is low, for example, in a case in which there is not only the user A but also another person within the field-of-view range of the surrounding person X, the person X may be determined not to be looking at the user A. Accordingly, it is possible to reduce the possibility of a case in which the speaking motion is detected although the user A is not actually spoken to.

Further, the detecting unit 122 performs an utterance detection process in a case in which it is determined that the person X is looking at the user A. For example, when the person X looking at the user A is detected, the sound collecting unit 32 may be caused to collect the surrounding sound in a direction in which the person X is located through a beam forming process. Further, the detecting unit 122 may determine that the person X speaks to the user A when a received sound level of a surrounding sound in a specific direction is equal to or higher than a predetermined level. Accordingly, the possibility of a case in which the user A is determined to be spoken to because the surrounding sound of the user A is higher for another reason and the user A is not spoken to is reduced.

Further, the utterance detection process is not limited to the above method. For example, the detecting unit 122 may determine that the person X looking at the user A speaks to the user A on the basis of a change in a tone of the received surrounding sound instead of detecting the utterance in accordance with the sound level of the received surrounding sound. Alternatively, the detecting unit 122 may detect a motion of a mouth of the person X looking at the user A on the basis of the received the surrounding image information and determine that the person X speaks to the user A in a case in which the sound level of the surrounding sound is equal to or higher than a predetermined level in conjunction with the motion of the mouth.

Further, the detecting unit 122 may perform a voice recognition process on an utterance included in the received sound information and determine that the person X looking at the user A speaks to the user A on the basis of a voice recognition result. For example, in a case in which a word identifying the user A such as a name or a nickname of the user A is included in an utterance, the detecting unit 122 may determine that the person X looking at the user A speaks to the user A.

1-3-2. Specifying Unit

The specifying unit 124 specifies the speaking motion information on the basis of the received surrounding image information, the line-of-sight information, and the surrounding sound information in a case in which the motion of the person X near the user A speaking to the user A is detected. The specifying unit 124 causes the specified speaking motion information to be stored in the storage unit 114. As described above, information of a motion or an utterance when the person X, Y, or Z near the user A is speaking to the user A may be included in the speaking motion information.

(1-3-2-1. Sound Information and Image Information)

In the present embodiment, when the motion of the surrounding person X speaking to the user A is detected by the detecting unit 122, the specifying unit 124 may specify the image information including the person X among the image information which is continuously received and recorded in the storage unit 114 as one piece of the speaking motion information. Further, when the motion of the surrounding person X speaking to the user A is detected by the detecting unit 122, the specifying unit 124 may specify the sound information considered to be the utterance of the person X among the sound information which is continuously received and recorded in the storage unit 114 as one piece of the speaking motion information. At this time, the specifying unit 124 may convert the voice recognition result of the utterance included in the sound information into text.

Further, the specifying unit 124 may specify, for example, moving images and sound obtained until the continuously received sound information is interrupted as the speaking motion information. Specifically, when a predetermined time elapses after the continuously received sound information is interrupted, the specifying unit 124 may regard the motion of the person X speaking to the user A to have ended and stop specifying the image information and the sound information as the speaking motion information. Further, the specifying unit 124 may stop recording the image information and the sound information in the storage unit 114 when the position of the user A deviates from the field-of-view range of the person X looking at the user A.

Further, an end of the specified speaking motion information is not limited to a time point at which the sound information is interrupted. For example, the specifying unit 124 may analyze the motion of the mouth of the person X speaking to the user A on the basis of the image information and regard a time at which the motion of the mouth of the person X stops as the end of the speaking motion information. Further, the specifying unit 124 may regard a time point at which a predetermined time elapses after the sound level of the sound information becomes less than a predetermined level as the end of the speaking motion information. Further, a timing to stop recording the image information and the sound information in the storage unit 114 is not limited to the time point at which the position of the user A deviates from the field-of-view range of the person X looking at the user A. The specifying unit 124 may stop recording the image information and the sound information at the same time at which it stops specifying the speaking motion information. In addition, the specifying unit 124 may stop recording the image information and the sound information when an appropriate condition is satisfied after the speaking motion is detected.

(1-3-2-2. Position Information)

The specifying unit 124 may specify position information between the user A and the person X speaking to the user A in conjunction with the recording of the image information and the sound information. At this time, the specifying unit 124 may specify not only a relative position of the user A and the person X in the space in which the user A is located but also a position of the person X with respect to the direction in which the user A faces. For example, the direction in which the user A faces may be detected on the basis of position information obtained by the GPS sensor installed in the display device 50 of the HMD device 100 or the image information transmitted from the imaging device 10. Further, for example, the position of the person X speaking to the user A may be detected on the basis of the received image information and the line-of-sight information.

(1-3-2-3. Person Attribute Information)

The specifying unit 124 may specify attribute information of the person X speaking to the user A in conjunction with the recording of the image information and the sound information and cause the attribute information to be stored in the storage unit 114. Specifically, the specifying unit 124 may specify information such as a name and an ID, a sex, and a relationship with the user A of the person X. For example, the specifying unit 124 may specify a person with reference to a database stored in the storage unit 114 or the like in advance on the basis of the image information transmitted from the imaging device 10 using a face recognition process or a feature quantity calculation method and specify attribute information linked with the database.

For example, in a case in which the person X speaking to the user A is a person having a business relationship such as a company colleague or a supervisor of the user A, a reason why the person X speaks is likely to do with a business. Further, in a case in which the person X is a person having a private relationship such as a friend or a family member of the user A, a reason why the person X speaks is likely to do with a private matter. Therefore, when the attribute information of the person X speaking to the user A is specified, the user A can easily determine the necessity of responding to the speaking motion.

(1-3-2-4. Other Specifying Information)

In addition to the above-described information, the specifying unit 124 may specify a date and time at which the person X speaks to the user A or information of content being used when the user A is spoken to and cause the specified information to be stored in the storage unit 114. The information of the content may be a type or name of content being used. For example, the specifying unit 124 may specify the information of the content, such as "used content=movie 'movie title OO'," "used content=video game 'game title OO'," "used content=music 'album title OO'."

Alternatively, the specifying unit 124 may specify image data of content being used when the user A is spoken to and cause the image data to be stored in the storage unit 114. The image data to be stored may be, for example, data of a still image of a content image being viewed or image data of an album design of music content. Since the information of the content being used when the user A is spoken to is specified together, a situation in which the user A is spoken to is associated with the substance of content, and thus the user A can easily recall the speaking motion information when checking the speaking motion information later.

(1-3-2-5. Specifying Information List)

FIG. 5 illustrates a list of information which the specifying unit 124 can specify for each speaking motion. When the motion of the person X speaking to the user A is detected, the specifying unit 124 may specify a date and time, the image information captured by the imaging device 10, the sound information collected by the sound collecting unit 32, the text information of the utterance content, the attribute information of the speaking person X, and the information of the content being used when the user A is spoken to and cause the specified information to be stored in the storage unit 114 as a speaking motion information group.

1-3-3. Internal Notification Control Unit

The internal notification control unit 126 gives a notification to the user A on the basis of the speaking motion information specified by the specifying unit 124. Here, the notification given to the user A may include at least one of a notification for causing an image to be displayed on the display screen of the image display unit 52 of the display device 50 and a notification for causing a sound to be output from the sound output unit 34 of the headphone device 30. For example, the internal notification control unit 126 may reproduce the speaking motion information which is specified by the specifying unit 124 and stored in the storage unit 114. At this time, the internal notification control unit 126 may reproduce the speaking motion information by combining one or more of the following notification methods.

(1-3-3-1. First Notification Method: Sound Time Shift Reproduction)

The internal notification control unit 126 may delay the sound information specified by the specifying unit 124 from a time at which the person X near the user A actually speaks to the user and then reproduce the sound information using time shift reproduction. At this time, the reproduction may start before the utterance of the person X ends, or the reproduction may start after the utterance of the person X ends. Since the sound information of the utterance of the surrounding person X undergoes the time shift reproduction, the user A can hear the utterance when the user is spoken to from the beginning.

Accordingly, since it is possible for the user A to understand a situation in which the user A is spoken to exactly, for example, the user A can easily understand a state of an emotion of the speaking person X, a degree of urgency, or the like. Therefore, the user A can determine whether or not the user A responds to the speaking motion, and the communication between the user A and the speaking person X can be improved. Further, in a case in which the degree of urgency of the reason for speaking is low, the user A can continue to enjoy the content provided by the HMD device 100, and thus the sense of immersion is hardly lost.

Further, in a case in which the time shift reproduction is performed, the internal notification control unit 126 may switch to a real time sound by gradually reducing a delay time from an actual utterance timing to a reproduction timing of the corresponding sound information. For example, the internal notification control unit 126 may turn off the noise cancellation function after the delay time is minimized while reproducing the sound information stored in the storage unit 114 once at an appropriate magnification rate of about 1.5 times so that the user A can hear the surrounding sound directly.

(1-3-3-2. Second Notification Method: Image Time Shift Reproduction)

The internal notification control unit 126 may perform the time shift reproduction on the image information specified by the specifying unit 124, similarly to the reproduction of the sound information. Further, in a case in which the time shift reproduction of the image information is performed, the internal notification control unit 126 may cause the image information transmitted from the imaging device 10 to be displayed on the image display unit 52 after the delay time is minimized while reproducing the image information stored in the storage unit 114 once at an appropriate magnification rate of about 1.5 times. Accordingly, since it is possible for the user A to understand a situation in which the user A is spoken to on the basis of the image information, the user A can easily understand a state of an emotion of the speaking person X, a degree of urgency, or the like. Therefore, the communication between the user A and the speaking person X can be improved, and the sense of immersion of the user A is hardly lost.

Further, when the specified image information is displayed on the image display unit 52, the internal notification control unit 126 may cause the image information serving as the speaking motion information to be displayed on the entire display screen. Alternatively, when the specified image information is displayed on the image display unit 52, the internal notification control unit 126 may cause the image information serving as the speaking motion information to be displayed superimposed on the content image being used. Since the specified image information is displayed superimposed on the content image, for example, in a case in which the user A desires to concentrate on the content being used, the user A can continuously use the content without responding to the speaking motion of the surrounding person X.

Further, in a case in which the time shift reproduction is performed on the specified image information and the sound information is performed, the internal notification control unit 126 may perform control such that the image information and the sound information recorded at the same time are reproduced at the same time.

(1-3-3-3. Third Notification Method: Reproduction Preparation)

When at least one of the specified image information and the sound information is reproduced, the internal notification control unit 126 may cause a preparation operation to be performed in advance. For example, the internal notification control unit 126 may reduce a volume of the content sound so that the user A can easily hear the sound before the specified sound information is reproduced. Further, the internal notification control unit 126 may temporarily stop the reproduction or the progress of music content or moving image content, a video game, or the like which is currently being used before the specified speaking motion information is reproduced.

Further, the internal notification control unit 126 may temporarily stop the noise cancellation function of the headphone device 30 before the specified sound information is reproduced. Accordingly, the user can easily hear the surrounding sound and talk with the surrounding person X in real time after responding to the speaking motion of the surrounding person X.

An instruction to start the preparation operation may be output, for example, when the detecting unit 122 detects the motion of the surrounding person X speaking to the user A. Further, the internal notification control unit 126 may start the reproduction of the speaking motion information after the preparation operation starts to be executed. Further, the internal notification control unit 126 may end the preparation operation at the same time as when the reproduction of the speaking motion information is stopped.

Further, the internal notification control unit 126 may let the user A to know that the content will be paused in a few seconds in advance prior to the reproduction preparation. For example, the internal notification control unit 126 gives the notice of the reproduction preparation operation 3 to 5 seconds before the instruction to start the reproduction preparation is output by means of a notification sound or voice, icon display, text display, or the like which is set in advance. Accordingly, the user A is prevented from being surprised when the content being used is abruptly stopped. Alternatively, the user A can stop the content at an appropriate timing before the content is stopped by the information processing device 110.

(1-3-3-4. Fourth Notification Method: Virtual Surround)

In a case in which the position information of the person X with respect to the direction of the user A is specified, the internal notification control unit 126 may cause the sound information to be output on the basis of the position information when the sound information is reproduced. Specifically, the internal notification control unit 126 may control the sound output such that the sound can be heard in direction in which the person X is located, using a virtual surround technique. For example, the virtual surround can be implemented by converting sound signals output from the left and right speaker boxes of the headphone device 30 into a binaural signal and performing a process of canceling a crosstalk.

Alternatively, the internal notification control unit 126 may perform the sound image localization process which is a technique of obtaining a stereophonic effect by the headphone device 30 by reproducing a head related transfer function so that the sound information can be heard in the direction in which the person X is located. Since the notification is given using the sound output as described above, when the user A knows that the user A is spoken to, the user A can easily respond in the direction in which the speaking person X is located. Accordingly, the communication between the user A and the speaking person X is improved.

(1-3-3-5. Fifth Notification Method: Display Form Change)

Figure 6:
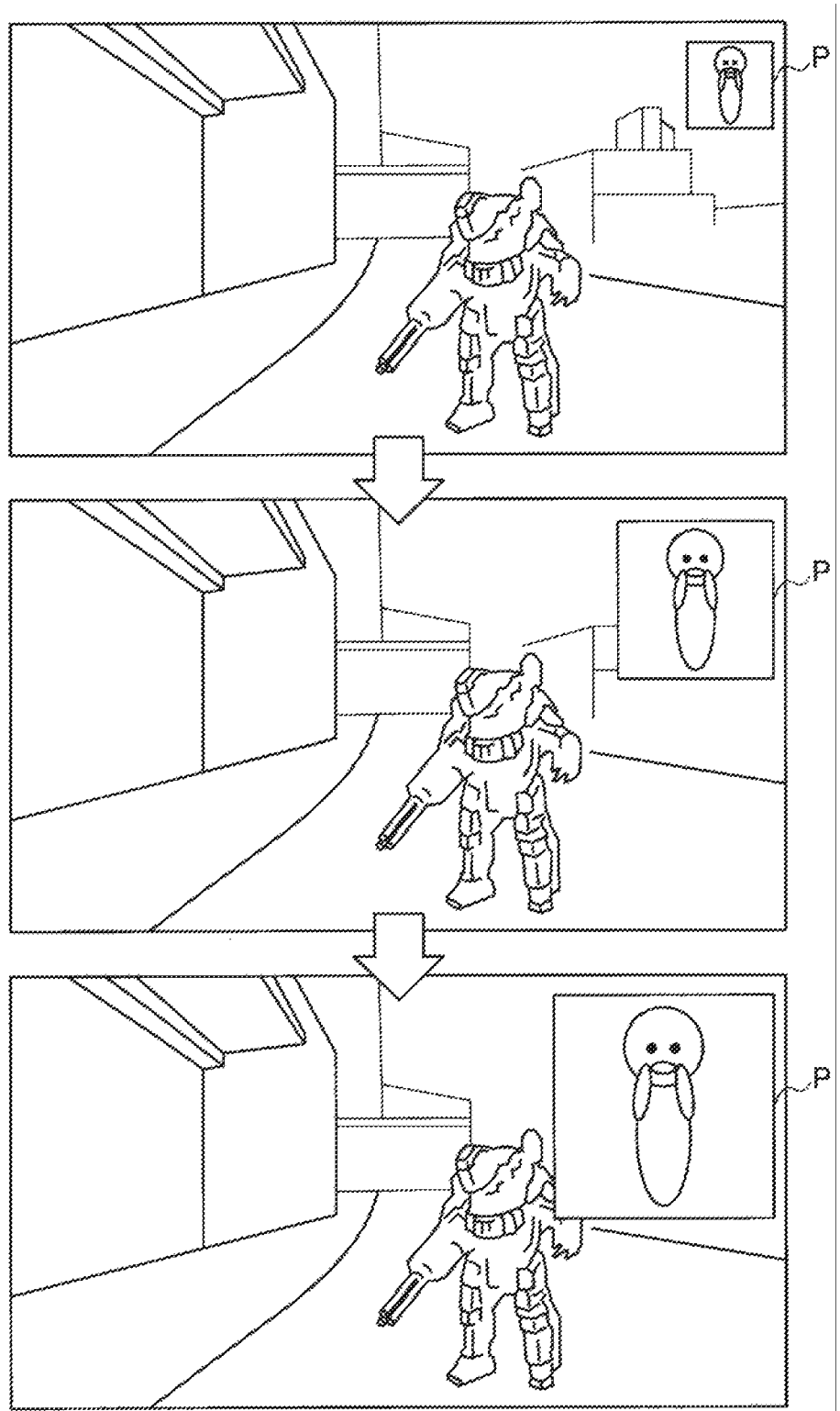
FIG. 6 is an explanatory diagram illustrating an example of causing image display to be changed.

The internal notification control unit 126 may cause an image display form to be changed when causing the specified image information to be displayed on the image display unit 52. For example, as illustrated in FIG. 6, the internal notification control unit 126 change a size of an image P to be superimposedly displayed on the basis of a duration of the speaking motion after the detecting unit 122 detects the motion of the surrounding person X speaking to the user A. In the example of FIG. 6, as the duration of the speaking motion increases, the image P to be superimposedly displayed gradually increases. Accordingly, it is possible for the user A to recognize a time at which the user A is spoken to and encourage the user A to respond to the speaking person X. On the other hand, as the size of the image P to be superimposedly displayed is gradually reduced on the basis of the duration of the speaking motion, the user A can continuously use the content without paying attention to the speaking motion in a case in which the user A has no intention to respond.

Further, a method of changing the displaying images form is not limited to the method of changing the image size. For example, the internal notification control unit 126 may change the transparency of an image to be superimposedly displayed. As the transparency of the image to be superimposedly displayed is gradually decreased on the basis of the duration of the speaking motion, the user A can continuously use the content without paying attention to the speaking motion in a case in which the user A has no intention to respond. On the other hand, as the transparency of the image to be superimposedly displayed is gradually increased on the basis of the duration of the speaking motion, it is possible to urge the user A to respond to the person X.

(1-3-3-6. Sixth Notification Method: Animation Display)

Figure 7:
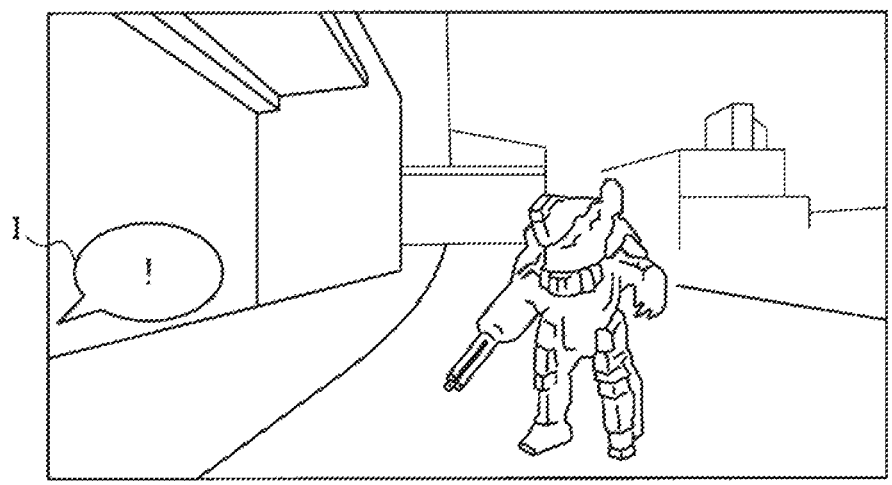
FIG. 7 is an explanatory diagram in which a direction in which a speaking person faces is indicated by an icon.

The internal notification control unit 126 may cause an icon or an animation to be displayed on the image display unit 52 on the basis of the specified speaking motion information. For example, as illustrated in FIG. 7, the direction in which the person X is located may be displayed on the basis of the position information of the person X with respect to the direction of the user A using an icon I such as a balloon or an arrow Since the icon I is displayed, the user A can easily understand the position of the speaking person X and respond in the direction in which the person X is located when responding. Therefore, the communication between the user A and the person X can be smoothly performed.

(1-3-3-7. Seventh Notification Method: Radar Display)

Figure 8:
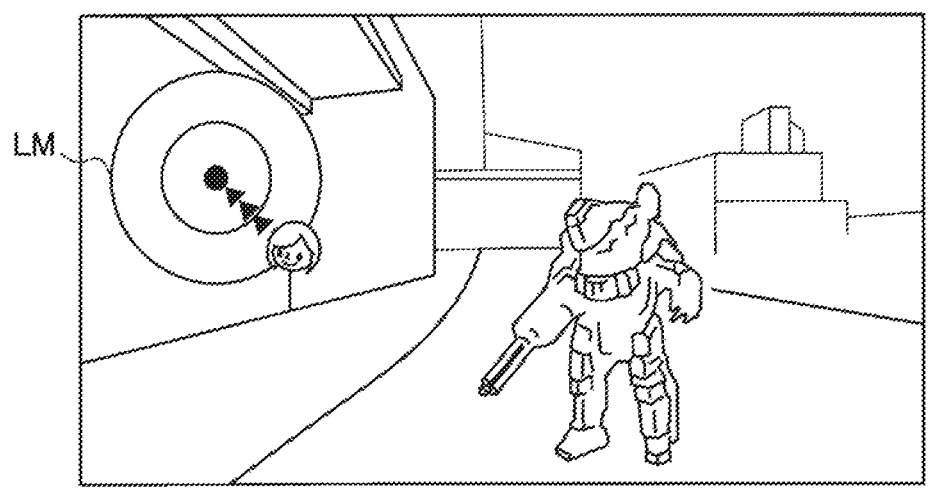
FIG. 8 is an explanatory diagram in which a direction in which a speaking person faces is indicated by a radar map.

The internal notification control unit 126 may cause the image display unit 52 to display the position information of the person X speaking to the user A with respect to the direction of the user A in a radar form on the basis of the specified speaking motion information. For example, FIG. 8 illustrates an example in which the direction in which the person X speaking to the user A is located is displayed in a radar map LM centering on the position of the user A in a form in which the user A looks down from above. In the example of the display of the radar map LM illustrated in FIG. 8, an upper side indicates a direction in which the user A currently faces. In other words, this example indicates that the person X speaks to the user A from the right rear.

Figure 9:
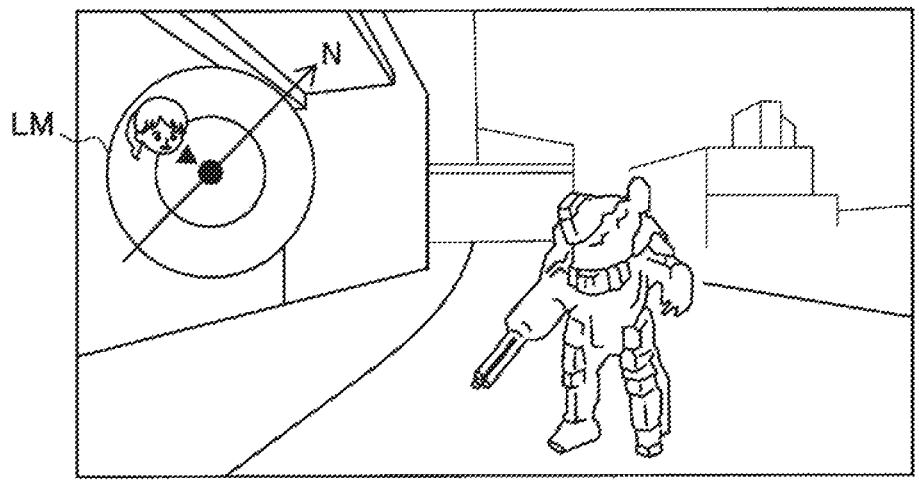
FIG. 9 is an explanatory diagram illustrating another example of a radar map.

In this example, a face image of the person X is displayed at the position at which the speaking person X is located, but an appropriate diagram may be displayed. Further, the display of the person X to be displayed may be changed in accordance with the change in the position of the person X with respect to the direction in which the user A faces. For example, the internal notification control unit 126 may move the face image or the diagram indicating the person X along with the movement of the user A or the person X. Further, as illustrated in FIG. 9, the internal notification control unit 126 may cause azimuth information of east, west, south, and north which can be acquired by a geomagnetic sensor or the like installed in the display device 50 or the like of the HMD device 100 to be displayed.

When the radar display is performed, the user A can easily understand the position of the speaking person X and respond in the direction in which the person X is located when responding. Further, for example, if the radar display is performed while the time shift reproduction is being performed on the sound information specified as the speaking motion information, it is possible to understand whether or not the person X who spoke is near the user A without change during the time shift reproduction. Therefore, the communication between the user A and the person X can be smoothly performed.

Further, the internal notification control unit 126 may cause information indicating a distance between the speaking person X and the user A to be displayed during the radar display. For example, in the example of the radar display of FIGS. 8 and 9, the number of diagrams (triangular diagrams) displayed between the face image of the person X and the position indication of the user A differs depending on the distance between the person X and the user A. Further, a method of displaying the distance between the person X and the user A is not limited to the examples in FIGS. 8 and 9.

Further, the internal notification control unit 126 may also cause a person near the user A other than the speaking person X to be displayed together during the radar display. In this case, the display of the person X may be characterized so that the user A can understand the speaking person X. For example, the display of the speaking person X may be caused to be larger than the display of other persons or may be blinked. Further, the transparency of the display of persons other than the speaking person X may be increased.

(1-3-3-8. Eighth Notification Method: Text Display)

Figure 10:
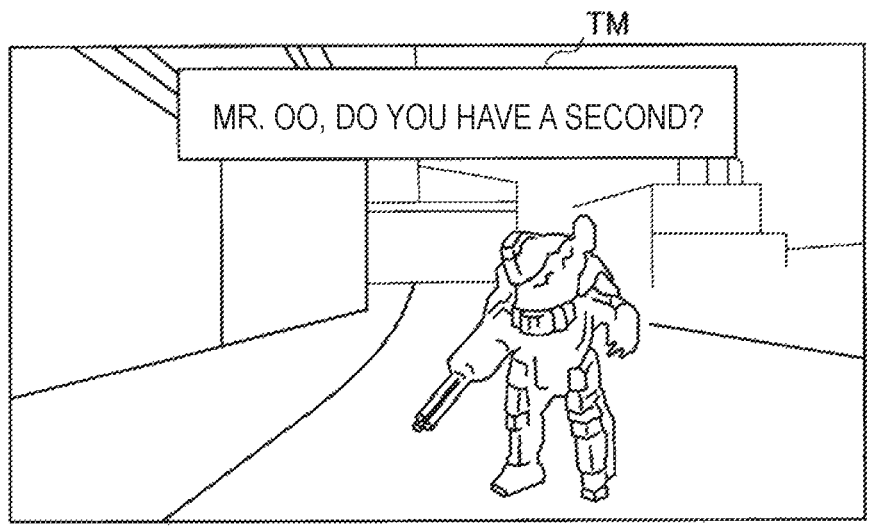
FIG. 10 is an explanatory diagram illustrating an example of displaying a text message of utterance content.

The internal notification control unit 126 may cause a text message TM to be displayed on the basis of the specified speaking motion information. For example, as illustrated in FIG. 10, the internal notification control unit 126 may cause the text information of the utterance specified by the specifying unit 124. In FIG. 10, a text message TM of "Mr. OO, do you have a second?" is displayed. In addition, the text message TM to be displayed may be a fixed message which is set in advance. The fixed message may be selected and displayed from a message group stored in the storage unit 114 or the like on the basis of the information included in the specified speaking motion information group. For example, "person at back of right side is speaking" or the like is displayed on the basis of the specified position information of the person X.

(1-3-3-9. Ninth Notification Method: Person Attribute Display)

The internal notification control unit 126 may cause the image display unit 52 to display the attribute information of the speaking person X on the basis of the specified speaking motion information. Specifically, the internal notification control unit 126 may cause the image display unit 52 to display information such as a name, an ID, a sex, a relationship with the user A, or the like of the person X specified by the specifying unit 124. Since the attribute information of the person X is displayed, the user A can easily notice the speaking person X and can determine a priority level of response.

1-3-4. Prohibition Processing Unit

The prohibition processing unit 128 prohibits control of giving a notification indicating that the user A is spoken to to the user A through the internal notification control unit 126. For example, there are cases in which the user A does not want to be spoken to such as a case in which the user A is sleeping while wearing the HMD device 100 or the headphone device 30 or a case in which the user A concentrates on content. In this case, the prohibition processing unit 128 performs control such that the notification indicating that the user A is spoken to is not given to the user A.

(1-3-4-1. Prohibition According to User State)

For example, the prohibition processing unit 128 may cause the image display unit 52 or the sound output unit 34 to prohibit the notification process performed by the internal notification control unit 126 on the basis of information indicating the status of the user A. For example, the prohibition processing unit 128 may prohibit the notification process performed by the internal notification control unit 126 in a case in which the user A performs a setting of prohibiting the notification operation. Alternatively, the prohibition processing unit 128 may prohibit the notification process performed by the internal notification control unit 126 in a case in which the user A is sleeping or in a case in which the concentration level of the user A is equal to or higher than a predetermined level. For example, the presence or absence of sleeping of the user A or the concentration level of the user A may be determined on the basis of detection information of a biometric sensor that detects a heart rate, a perspiration state, a brain wave, or the like of the user A. Alternatively, the presence or absence of sleeping of the user A may be determined on the basis of detection information of a sensor that detects the line of sight of the user A installed in the display device 50 of the MID device 100.

(1-3-4-2. Prohibition According to Person Attribute)

The prohibition processing unit 128 may prohibit the notification process performed by the internal notification control unit 126 on the basis of the attribute information of the speaking person X included in the specified speaking motion information. For example, in a case in which the speaking person X is a person who is unknown to the user A or a person to whom the user A performs a setting of prohibiting a notification, the prohibition processing unit 128 may prohibit the notification process performed by the internal notification control unit 126. Accordingly, the user A can decide the priority of the response in advance depending on the speaking person, and thus it is possible to reduce a possibility that the sense of immersion will be damaged.

(1-3-4-3. Prohibition According to Time Setting)

The prohibition processing unit 128 may cause the image display unit 52 or the sound output unit 34 to prohibit the notification process performed by the internal notification control unit 126 during a period of time which is set in advance. For example, the user A may manage a period of time in which the notification process is prohibited by presetting a time at which the prohibition of the notification process performed by the internal notification control unit 126 starts and a time at which the prohibition is canceled or by setting the period of time in which the notification process is prohibited using a timer in advance. Accordingly, the user A can prevent the immersion experience from being disturbed for a predetermined period of time. Further, when a notification indicating a preset time is given to the surrounding people, it is possible to prevent the surrounding people from feeling dissatisfaction since the user does not respond when the user is spoken to.

(1-3-4-4. Prohibition According to Surrounding Volume)

The prohibition processing unit 128 may cause the sound output unit 34 to prohibit the notification process performed by the internal notification control unit 126 in a case in which the sound level of the surrounding sound is higher than the sound level of the content being currently heard by a predetermined level or more. For example, the prohibition processing unit 128 may determine whether or not the notification process is prohibited in accordance with the ratio of the sound level of the surrounding sound to the sound level of the content sound currently being heard. Further, the prohibition processing unit 128 may determine whether or not the notification process is prohibited in accordance with a difference between the sound level of the content sound currently being heard and the sound level of the surrounding sound. Accordingly, it is possible to prevent the user A from being surprised by preventing the user A from hearing a big sound abruptly.

(1-3-4-5. Prohibition According to State of Content)

The prohibition processing unit 128 may cause the sound output unit 34 to prohibit the notification process performed by the internal notification control unit 126 on the basis of the state of the content currently being used. For example, the prohibition processing unit 128 may prohibit the notification process at a specific scene or timing at which the user A is required to have a concentrated state in a movie being currently watched or a video game being used. Such a specific scene or timing may be set for each content in advance or may be determined on the basis of a high point of a content sound, a change in a hue of a content image, or the like. Further, the prohibition processing unit 128 may prohibit the notification process in a case in which content of a type or specific content which is set to be prohibited by the user A in advance is used. Accordingly, it is possible to reduce the possibility that the sense of immersion will be damaged because the surrounding person speaks to the user A when the user A is excited with the content being used.

1-4. PROCESS PERFORMED BY DEVICE

Figure 11:
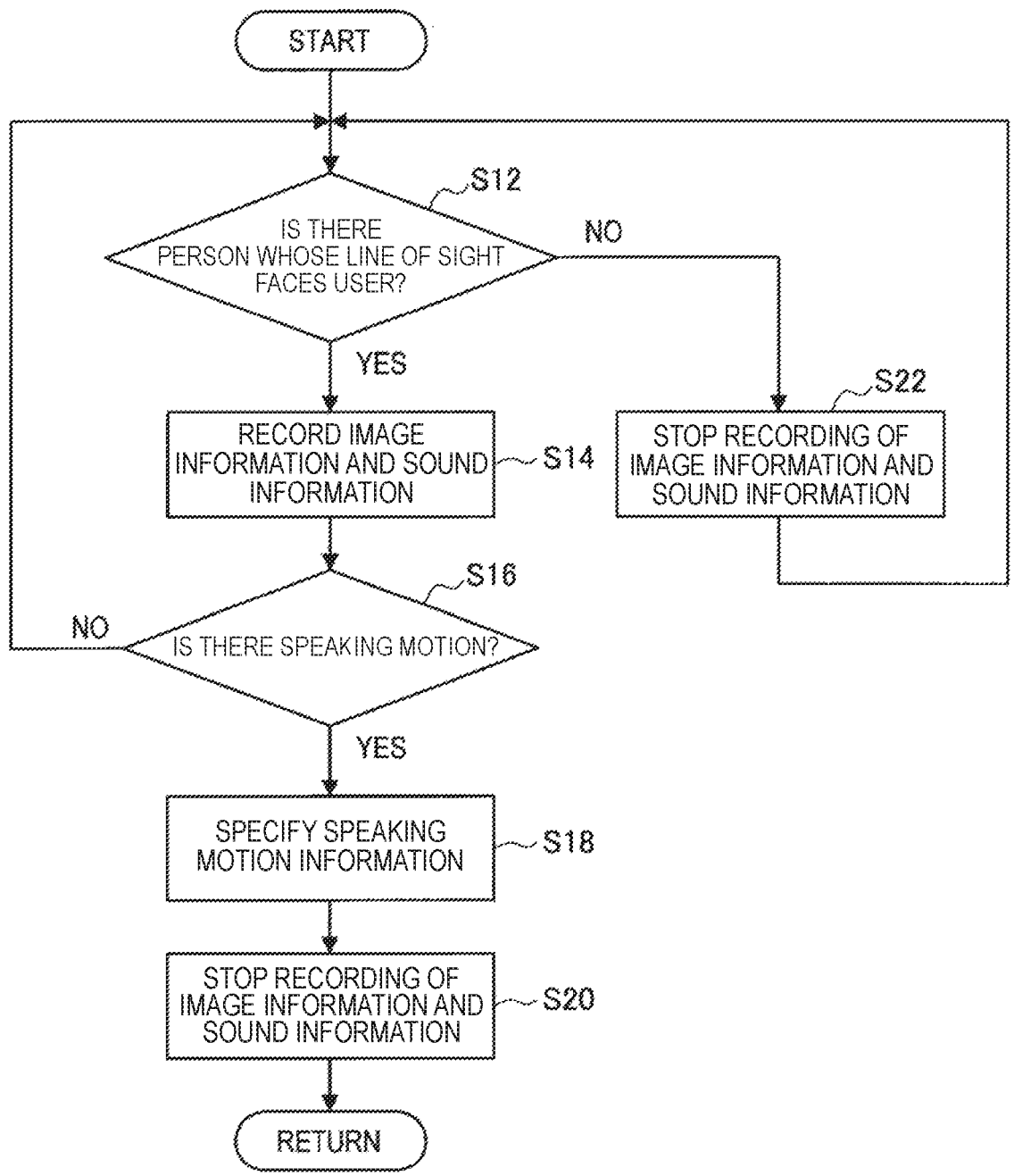
FIG. 11 is a flowchart illustrating a process performed by the information processing device according to the embodiment.

Next, an example of a process performed by the information processing device 110 according to the present embodiment will be described. FIG. 11 is a flowchart conceptually illustrating a process performed by the information processing device 110.

1-4-1. Basic Flow

First, the information processing device 110 determines whether or not there is a person whose line of sight faces the user A wearing the HMD device 100 and the headphone device 30 (step S12). Specifically, on the basis of the surrounding image information and the line-of-sight information transmitted from the imaging device 10, the detecting unit 122 of the information processing device 110 determines whether or not a person having a field-of-view range within which the position of the user A is included is near the user A. At this time, in a case in which the position of the user A is included within the field-of-view range of the person, but there is another person near the user A, it may not be determined that there is a person whose line of sight faces the user A.

In a case in which it is determined that there is no person whose line of sight faces the user A (No in S12), the information processing device 110 causes the process to proceed to step S22. In this case, the information processing device 110 stops the recording of the image information and the sound information in the storage unit 114 (step S22) and then cause the process to return to step S12. On the other hand, in a case in which it is determined that there is a person X whose line of sight faces the user A (Yes in S12), the information processing device 110 causes the process to proceed to step S14. Then, the information processing device 110 causes the storage unit 114 to record image information and the sound information which are continuously received.

Then, the information processing device 110 determines whether or not the person X whose line of sight faces the user A speaks to the user A (step S16). Specifically, the detecting unit 122 performs the utterance detection process on the basis of the surrounding sound information collected and transmitted by the sound collecting unit 32. For example, the detecting unit 122 causes the sound collecting unit 32 to collect the surrounding sound in the direction in which the person X looking at the user A is located using the beam forming process and determine whether or not the sound level of the received surrounding sound is equal to or higher than a predetermined level. The detecting unit 122 may perform the above determination on the basis of the change in the tone of the received surrounding sound.

In a case in which the person whose line of sight faces the user A is determined not to speak to the user A (No in S16), the process returns to step S12, and the flow is repeated. On the other hand, in a case in which the person X whose line of sight faces the user A is determined to speak to the user A (Yes in S16), the information processing device 110 causes the process to proceed to step S18. Then, the information processing device 110 specifies the information indicating the motion of the person X speaking to the user A on the basis of the image information and the sound information recorded in the storage unit 114 (step S18).

Specifically, in a case in which the motion of the person X speaking to the user A is detected, the specifying unit 124 of the information processing device 110 may specify the image information including the person X among the image information which is continuously received and recorded as one of the speaking motion information. Further, in a case in which the motion of the person X speaking to the user A is detected, the specifying unit 124 may specify the sound information considered to be the utterance of the person X among the sound information which is continuously received and recorded as one of the speaking motion information.

At this time, the specifying unit 124 may perform the voice recognition on the utterance of the person X included in the sound information and convert the voice recognition result into a text. Further, in addition to the image information and the sound information, the specifying unit 124 may specify the position information of the user A and the person X, the attribute information of the person X, the date and time at which the user A is spoken to, the information of the content being used when the user A is spoken to, or the like. Further, the specifying unit 124 ends the specifying of the speaking motion information, for example, when the utterance of the person X to the user A is interrupted for a predetermined time or more.

The information processing device 110 causes the specified speaking motion information to be stored in the storage unit 114. For example, the specifying unit 124 causes the information to be stored in the storage unit 114 as the speaking motion information group illustrated in FIG. 5.

Then, the information processing device 110 stops the recording of the image information and the sound information in the storage unit 114 (step S20). Specifically, after specifying the speaking motion information, the specifying unit 124 stops the recording of the image information and the sound information in the storage unit 114 in a case in which the line of sight of the person X deviates from the user A. Thereafter, the information processing device 110 causes the process to return to step S12 and repeats the above-described flow.

As described above, when the person X near the user A speaks to the user A wearing the HMD device 100 and the headphone device 30 as the immersive sensory device, the information processing device 110 according to the present embodiment specifies the speaking motion information and stores the speaking motion information to be stored in the storage unit 114. Accordingly, the user A can notice that the user A is spoken to when the notification indicating the speaking motion is given with a delay from the time point at which the user A is spoken to.

1-4-2. Time Shift Reproduction Process

Figure 12:
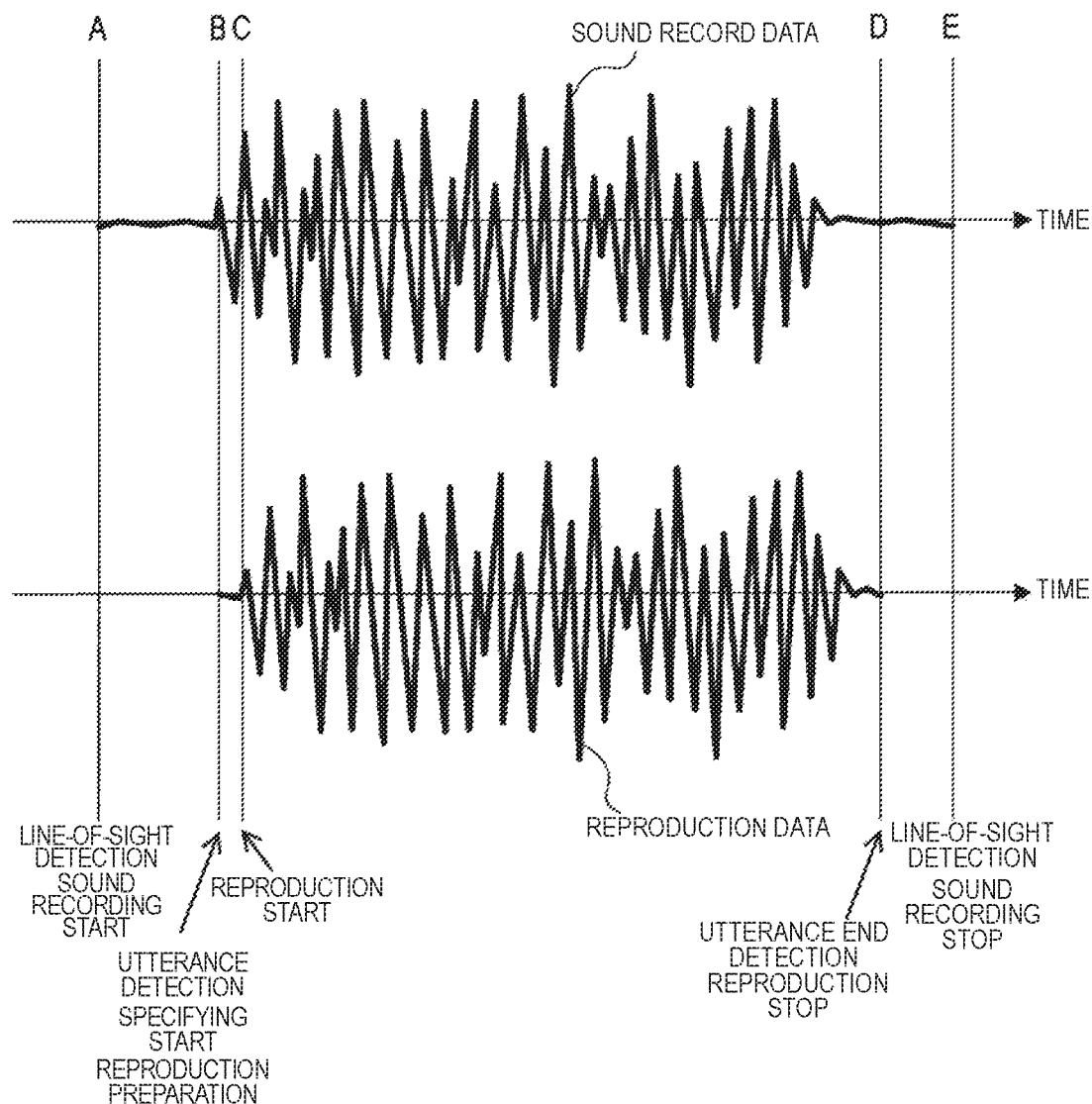
FIG. 12 is an explanatory diagram illustrating a sound information time shift reproduction process.
Figure 13:
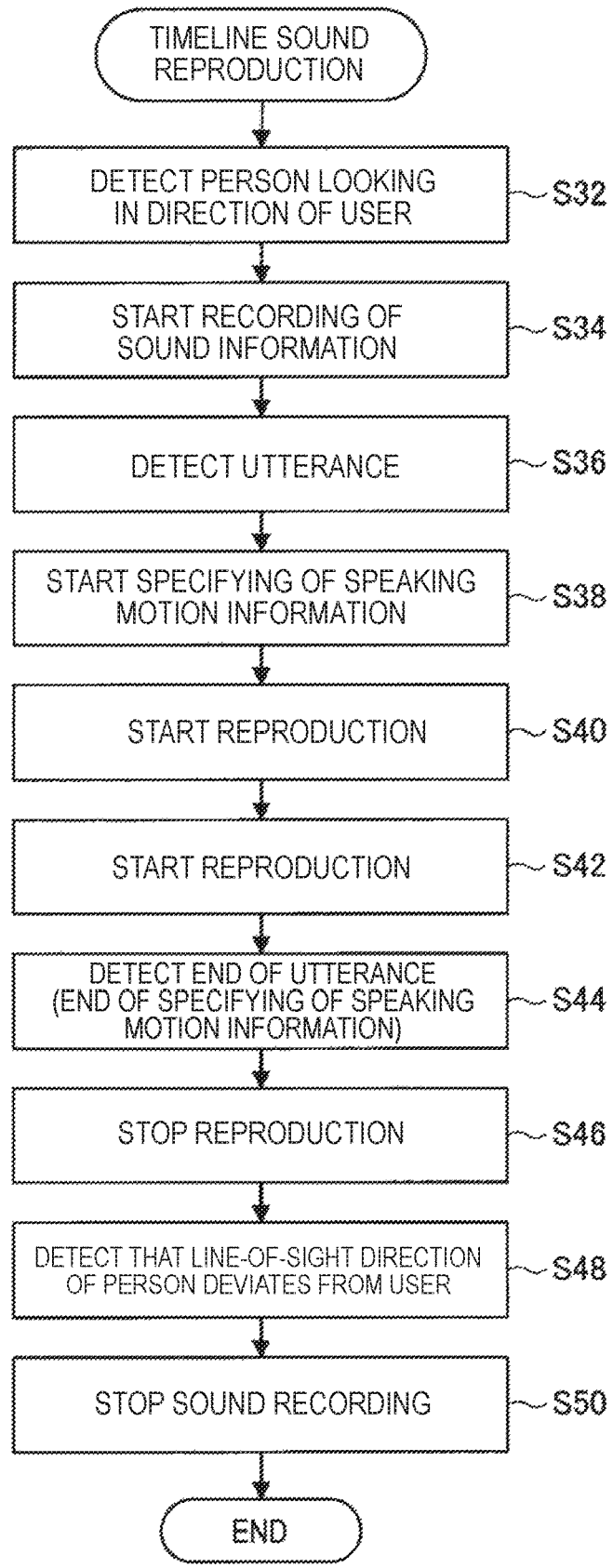
FIG. 13 is a flowchart illustrating a sound information time shift reproduction process.

Then, as an example of a process performed by the information processing device 110 according to the present embodiment, the flow of specifying the sound information serving as the speaking motion information and performing the time shift reproduction on the sound information will be described. FIG. 12 is an explanatory diagram illustrating the time shift reproduction process of the sound information performed by the information processing device 110, and an upper portion indicates recording data, and a lower portion indicates reproduction data. Further, FIG. 13 is a flowchart conceptually illustrating the time shift reproduction process of the sound information performed by the information processing device 110.

First, at a time A, the information processing device 110 detects a person looking in the direction of the user A on the basis of the image information and the line-of-sight information transmitted from the imaging device 10 (step S32). Specifically, the detecting unit 122 may perform the determine in accordance with whether or not the position of the user A is included in the field-of-view range specified on the basis of the line-of-sight information of the surrounding person in accordance with the process of step S12 in the flowchart of FIG. 11.

If a person looking in the direction of the user A is detected, the information processing device 110 causes the storage unit 114 to start recording of the received sound information (step S34). Specifically, the detecting unit 122 causes the storage unit 114 to store the sound information which is continuously received after the person X looking in the direction of the user A is detected.

Then, at a time B, the information processing device 110 detects that the person X looking in the direction of the user A speaks (step S36). More specifically, the detecting unit 122 may perform the utterance detection process in accordance with the process of step S16 in the flowchart of FIG. 11 and perform the determination in accordance with whether or not the sound level in the direction in which the person X is located is equal to or higher than a predetermined level.

If the utterance of the person X looking at the user A is detected, the information processing device 110 specifies the sound information received after the time B at which the utterance is detected as the speaking motion information and cause the sound information to be stored in the storage unit 114 (step S38). Specifically, the specifying unit 124 causes the storage unit 114 to store the sound information received after the utterance is detected as one of the speaking motion information.

Further, the information processing device 110 starts the reproduction preparation of the sound information specified and stored as the speaking motion information (step S40). Specifically, the internal notification control unit 126 may decrease the volume of the content sound currently being viewed by the user A or temporarily stop the reproduction or the progress of the content currently being used. Alternatively, the internal notification control unit 126 may temporarily stop the noise cancellation function of the headphone device 30.

Then, at a time C, the information processing device 110 starts the reproduction of the sound information specified and stored as the speaking motion information (step S42). Specifically, the internal notification control unit 126 reproduces the recorded sound information with a slight delay from an actual utterance timing of the person X and causes the sound information to be output from the sound output unit 34 of the headphone device 30. The internal notification control unit 126 may start the reproduction of the sound information promptly after the reproduction preparation is completed or may start the reproduction of the sound information with a preset time difference. At this time, the sound may be heard in the direction in which the person X is located using the virtual sound technique.

Then, at a time D, the information processing device 110 detects the end of the utterance of the person X (step S44). Specifically, the specifying unit 124 may detect the end of utterance of the person X in a case in which a predetermined time elapses after the sound information in the direction of the person X is interrupted. Thus, the specifying of the sound information serving as the speaking motion information ends.

At the time D at which the end of the utterance of the person X is detected, the information processing device 110 stops the reproduction of the sound information (step S46). Specifically, the internal notification control unit 126 stops the reproduction after reproducing the sound information obtained until the specifying ends in step S44.

Then, at a time E, the information processing device 110 detects that the line of sight of the person X looking in the direction of the user A deviates from the user A (step S48). Specifically, the detecting unit 122 may perform the determination in accordance with whether or not the position of the user A deviates from the field-of-view range of the person X looking at the user A on the basis of the received image information and the line-of-sight information.

If the line of sight of the person X looking in the direction of the user A is detected to deviate from the user A, the information processing device 110 stops the recording of the image information and the sound information in the storage unit 114. In a case in which the line of sight of the person X deviates from the user A at a time point at which the end of the utterance is detected in step S44, the recording of the image information and the sound information may be stopped while stopping the reproduction of the sound information.

Further, the time shift reproduction process of the sound information serving as the speaking motion information has been described here, but the image information specified as the speaking motion information may also undergo the time shift reproduced through a similar procedure. Further, since the sound information and the image information undergo the time shift reproduction at the same timing, the user A can notice a situation in which the user A is spoken to auditorily or visually.

As described above, when the motion of the person X speaking to the user A is detected, the information processing device 110 specifies the speaking motion information from the received image information and the sound information and causes the time shift reproduction to be performed. Therefore, the user A can notice not a situation after the user A is spoken to but a situation in which the user A is spoken to. Accordingly, the user A can respond after understanding the state of the emotion of the speaking person X, the degree of urgency, or the like, and the communication between the user A and the person X speaking to the user A can be improved.

1-5. CONCLUSION OF FIRST EMBODIMENT

As described above, according to the first embodiment of the present disclosure, the information processing device 110 receives the image information around the user A, the line-of-sight information of the surrounding person, and the surrounding sound information and detects the motion of the surrounding person X speaking to the user A on the basis of surrounding information. Then, in a case in which the speaking motion of the surrounding person X is detected, the information processing device 110 specifies the speaking motion information on the basis of the received surrounding information. For this reason, even in a case in which a time difference occurs between the time point at which the person X speaks to the user A and a time point at which the notification indicating that the user A is spoken to is given to the user A, the user A can understand the situation in which the user A is spoken to when the notification indicating that the user A is spoken to is given. Accordingly, the user A can determine whether or not the response is necessary or how the response is performed in accordance with the speaking state of the person X, and thus the communication between the user A and the person X speaking to the user A can be improved.

Further, in addition to the image information of the person X speaking to the user A and the sound information including the utterance content of the person X, the information processing device 110 may specify the position information of the person X with respect to the direction of the user A, the attribute information of the person X, the date and time at which the user A is spoken to, and the information of the content being used as the speaking motion information. Accordingly, the user A can understand the information when the person X speaks in further detail and easily determine whether or not the response to the person X is necessary or how the response is performed.

Further, on the basis of the specified speaking motion information, the information processing device 110 can cause the image display unit 52 to display an image and causes the sound output unit 34 to output the sound. At this time, the information processing, device 110 performs the time shift reproduction on the image information and the sound information, and thus even in a case in which there is a time difference between the time point at which the user A is spoken to the time point at which the notification is given to the user A, the user A can understand the situation in which the user A is spoken to.

Further, the information processing device 110 may temporarily stop the content, reduce the volume, or temporarily stop the noise cancellation function of the headphone device 30 before reproducing the specified image information and the sound information, or the like. Accordingly, the user A can easily recognize the notification indicating that the user A is spoken to, and the communication with the speaking person X can be improved.

Further, when the specified sound information is specified, the information processing device 110 can control the sound output such that the sound can be heard in the direction in which the person X is located. Accordingly, the user A can respond in the direction in which the person X is located when responding to the speaking of the person X.

Further, the information processing device 110 may cause the image display to be changed on the basis of a speaking period of time when the specified image information is displayed. Accordingly, it is possible to encourage the user A to respond to the speaking person X or to cause the user A to continuously use the content by causing the image display to be gradually disappear.

Further, the information processing device 110 can provide the position information of the person X with respect to the direction of the user A using the animation display or the radar display when the notification indicating that the user A is spoken to is given to the user A. Accordingly, the user A can respond in the direction in Which the person X is located when responding to the speaking of the person X. Further, in a case in which the time shift reproduction is performed on the speaking motion information, it is possible to understand whether or not there is a speaking person X near the user during the time shift reproduction.

Further, the information processing device 110 may cause the image display unit 52 to display the text message when the notification indicating that the user A is spoken to is given to the user A. Accordingly, the user A can visually recognize the speaking motion of the person X or the utterance content of the person X.

Further, the information processing device 110 may cause the image display unit 52 to display the attribute information of the person X when the notification indicating that the user A is spoken to is given to the user A. Accordingly, the user A can easily notice the speaking person X and determine the priority level of the response.

Further, the information processing device 110 may prohibit control of giving the notification indicating that the user A is spoken to to the user A under a predetermined condition. Accordingly, the notification operation is not performed in a case in which the user A does not want to be spoken to such as in a case in which the user A is sleeping while wearing the immersive sensory device or in a case in which the user is concentrating on the content.

1-6. MODIFIED EXAMPLES

The first embodiment of the present disclosure has been described above. Further, the present embodiment is not limited to the above example. Several modified examples of the present embodiment will be described below.

1-6-1. First Modified Example

As a first modified example of the present embodiment, the information processing device 110 may generate speaking history information which is history information when the user A is spoken to on the basis of the speaking motion information specified by the specifying unit 124. Specifically, the information processing device 110 specifies the speaking motion information on the basis of the received image information and the sound information each time the motion of the surrounding person speaking to the user A is detected and cause the speaking motion information to be stored in the storage unit 114. Further, in a case in which a history confirmation operation is selected in accordance with an input operation of the user A, the information processing device 110 generates the speaking history information on the basis of the speaking motion information stored so far and causes the image display unit 52 to display a list of the speaking history information. Accordingly, for example, the user A can check the person who speaks to the user A while using the content and a situation at that time after finishing the use of the content.

Figure 14:
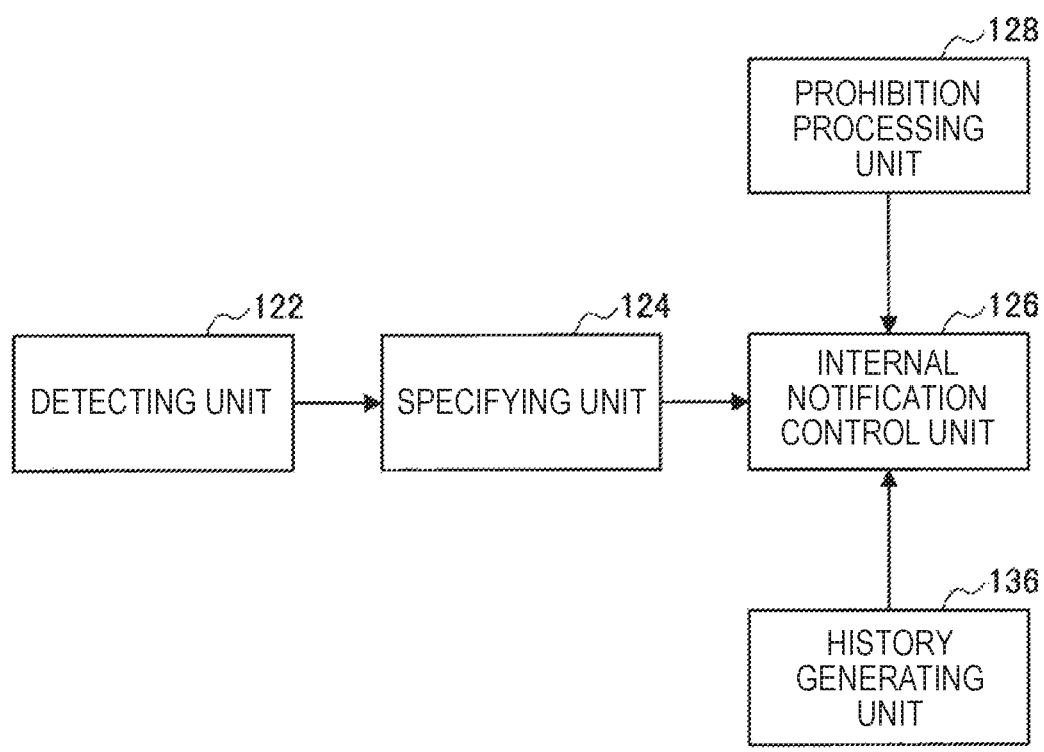
FIG. 14 is a functional block diagram illustrating an example of a configuration of an integrated control unit of an information processing device according to a first modified example of the embodiment.

FIG. 14 is a functional block diagram illustrating an example of a configuration of an integrated control unit 120 of an information processing device 110 according to the first modified example. In the integrated control unit 120, a history generating unit 136 is added to the integrated control unit 120 according to the first embodiment. The detecting unit 122, the specifying unit 124, the internal notification control unit 126, and the prohibition processing unit 128 may have similar functions as those of the above-described units. In a case in which the history confirmation operation is selected in accordance with the input operation of the user A, the history generating unit 136 generates the speaking history information on the basis of the speaking motion information with reference to the storage unit 114. The internal notification control unit 126 causes the image display unit 52 to display the generated speaking history information.

Figure 15:
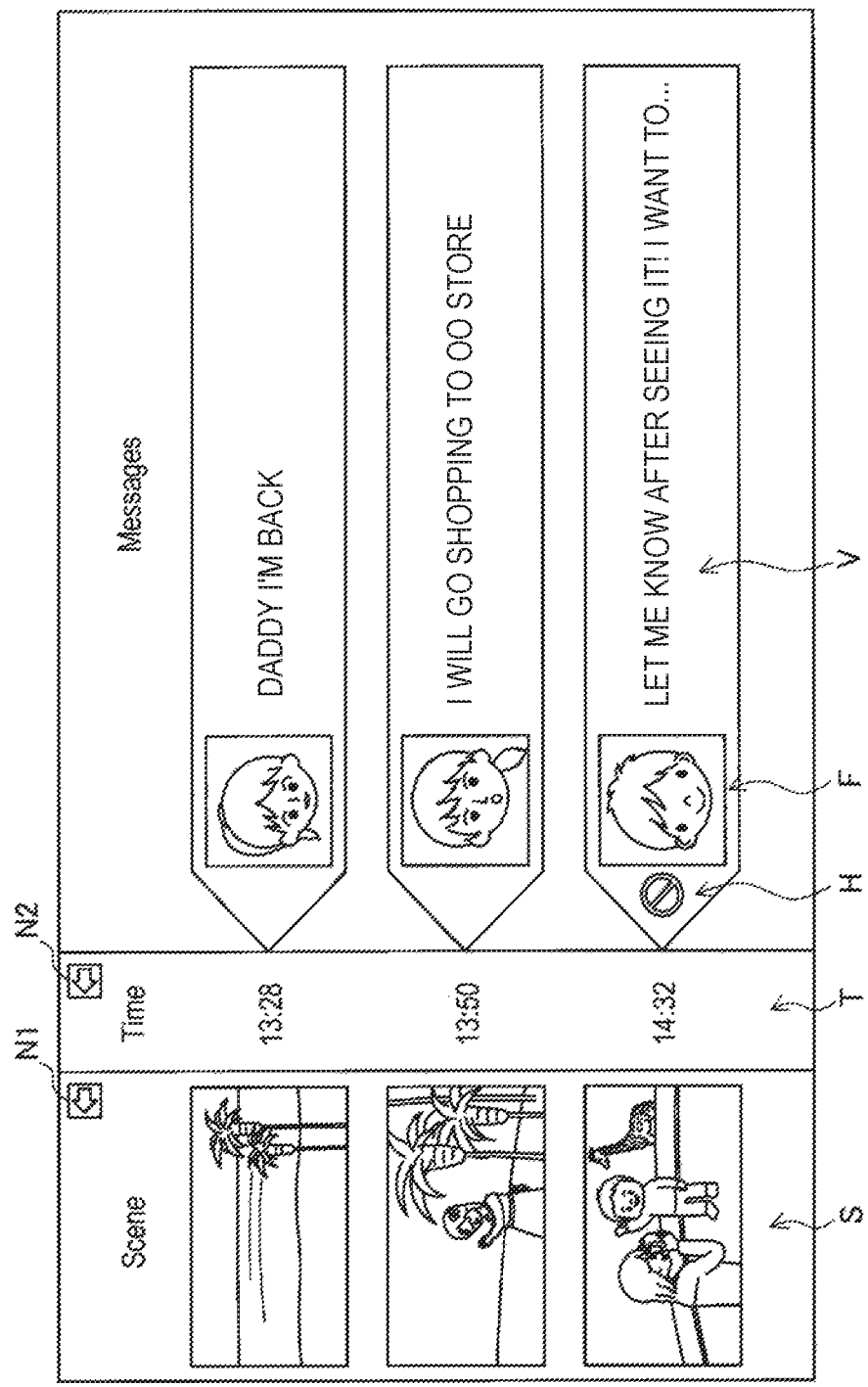
FIG. 15 is an explanatory diagram illustrating an example of speaking history information.

FIG. 15 illustrates an example of a history display to be displayed on the image display unit 52. In the example of such a history display, a content image S indicating that the user is watching when the user is spoken to, a speaking time T, a face photograph F of a speaking person, a voice recognition result V of utterance content, and an icon H indicating that the prohibition process is being performed when the user is spoken to are displayed. Further, it is possible to cause the content image S and the time T not to be displayed by selecting non-display selection buttons N1 and N2.

Figure 16:
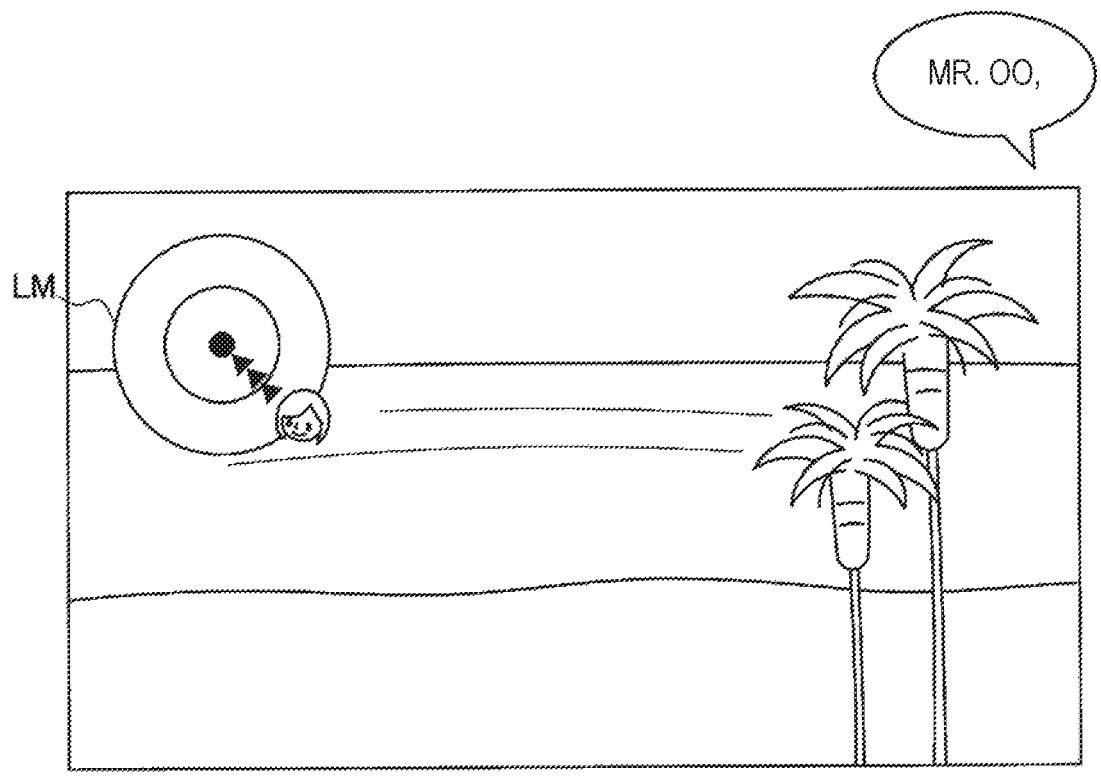
FIG. 16 is an explanatory diagram illustrating an example of reproducing a moving image scene.

In the example of such a history display, the content image S is a still age of a moving image scene when the user is spoken to. When the user A selects the content image S, the history generating unit 136 may cause the moving image scene to be reproduced. For example, the history generating unit 136 may cause the moving image scene to be reproduced a few seconds (for example, 5 seconds) from the time at which the user is spoken to. Alternatively, the history generating unit 136 may cause the moving image scene to be reproduced for several seconds from the scene of the content image S. At this time, when the moving image scene is reproduced, the history generating unit 136 may reproduce the notification process executed by the internal notification control unit 126 when the user is spoken to. For example, as illustrated in FIG. 16, the history generating unit 136 may cause the radar map LM to be superimposedly displayed or cause the sound information of the utterance to be output with the reproduction of the moving image scene.

Further, when the voice recognition result V of the utterance content is displayed, the history generating unit 136 may cause a predetermined number of characters from the beginning to be displayed instead of the full sentence of the utterance content. Further, in a case in which there is a continuation of the displayed text message, the history generating unit 136 may cause a message indicating that there is a continuation such as " . . . " or the like to be displayed. Further, the history generating unit 136 may cause the text message to be scrolled and displayed while the user A selects one of the voice recognition results of the utterance content using a cursor.

As described above, according to the first modified example of the present embodiment, the information processing device 110 can cause the history of the speaking motion to the user A to be displayed. Therefore, the user A can check the speaking motion while wearing the immersive sensory device after a time elapses. Accordingly, the user A can check a requirement later for a person whom the user was unable to respond because the user was sleeping or concentrating on content, and thus the communication between the user A and the person speaking to the user A can be improved.

Further, in the above example, the history generating unit 136 generates the speaking history information in accordance with the input operation of the user A, but the history generating unit 136 may automatically generate the speaking history information when the used content ends or is stopped and cause the speaking history information to be displayed on the image display unit 52. Further, the history display illustrated in FIG. 15 is merely an example, and a part of the displayed speaking motion information may be omitted or may be replaced with another the speaking motion information, or another speaking motion information may be added.

1-6-2. Second Modified Example

As a second modified example of the present embodiment, the information processing device 110 may cause the external notifying unit 56 of the display device 50 to display a notification to be given to the surrounding person. For example, the information processing device 110 may cause a notification indicating whether or not the surrounding person can speak to the user A, a response state of the information processing system, or the state of the user A to be given to the surrounding person. Accordingly, the person near the user A wearing the immersive sensory device can determine whether or not the user A is in a situation in which the user A is allowed to be spoken to in advance and can be prevented from feeling anxious about whether or not the speaking is transferred while speaking to the user A.

Figure 17:
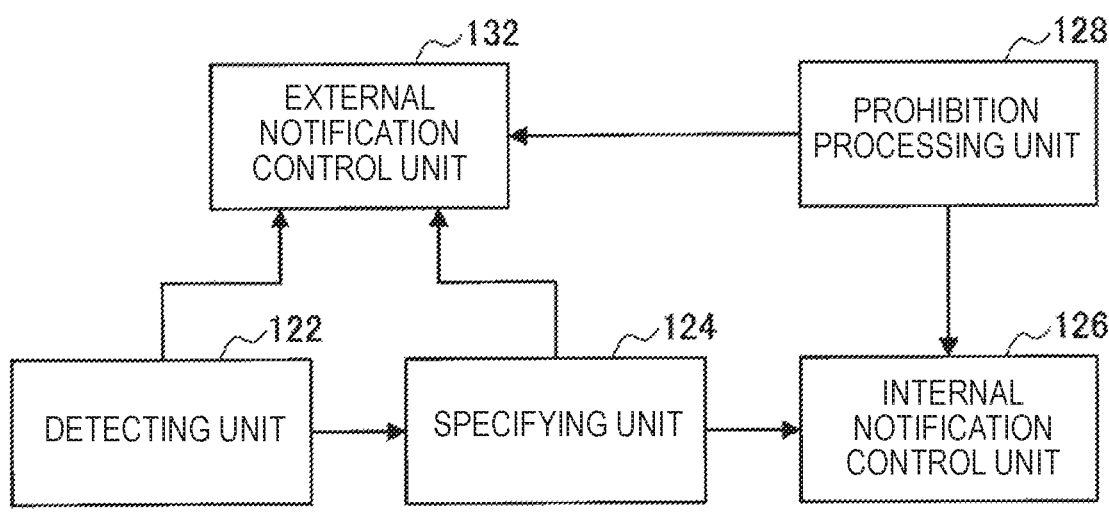
FIG. 17 is a functional block diagram illustrating an example of a configuration of an integrated control unit of an information processing device according to a second modified example of the embodiment.

FIG. 17 is a functional block diagram illustrating an example of a configuration of the integrated control unit 120 of the information processing device 110 according to the second modified example. In the integrated control unit 120, an external notification control unit 132 is added to the integrated control unit 120 according to the first embodiment. The detecting unit 122, the specifying unit 124, the internal notification control unit 126, and the prohibition processing unit 128 may have similar functions as those of the above-described units. The external notification control unit 132 causes the external notifying unit 56 of the display device 50 to perform predetermined notification display on the basis of an operation or a setting of the detecting unit 122, the specifying unit 124, or the prohibition processing unit 128.

Figure 18:
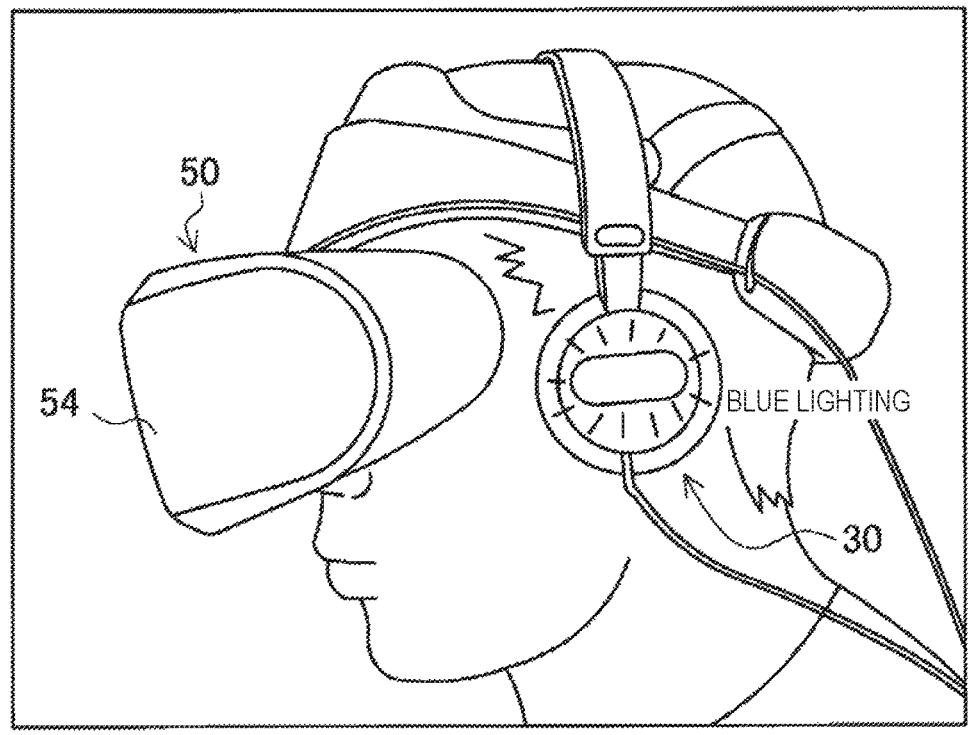
FIG. 18 is an explanatory diagram illustrating an example of notifying a surrounding person of a state in which a notification operation to the user is permitted.
Figure 19:
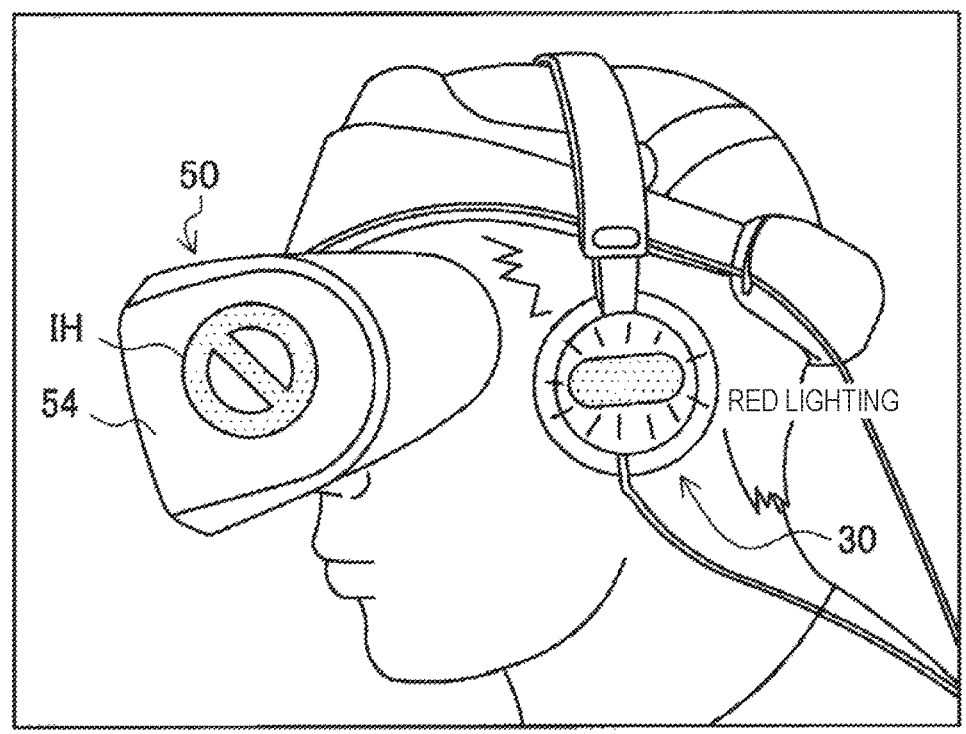
FIG. 19 is an explanatory diagram illustrating an example of notifying a surrounding person of a state in which a notification operation to the user is prohibited.

Specifically, the external notification control unit 132 may cause the external notifying unit 56 to display a current permission state of the notification operation to the user A on the basis of the setting of the prohibition processing unit 128. FIG. 18 illustrates a state in which the notification operation to the user A is permitted, and FIG. 19 illustrates a state in which the notification operation to the user A is prohibited. For example, in a case in which the notification operation to the user A is permitted, the external notification control unit 132 may cause the external notifying unit 56 of the display device 50 of the HMD device 100 not to perform the display, whereas in a case in which the notification operation to the user A is prohibited, the external notification control unit 132 may cause the external notifying unit 56 of the display device 50 to display an icon IH indicating the prohibition state. Further, in a case in which the external notifying unit is installed in the speaker box of the headphone device 30, the external notification control unit 132 may cause the external notifying unit to display a blue color when the notification operation to the user A is permitted and a red color when the notification operation to the user A is prohibited.

Further, the external notification control unit 132 may cause a notification indicating a responsible state of the user A to be given when causing the permission state of the notification operation to the user A to be displayed. For example, it is possible to perform display to be transferred to the surrounding person such as display indicating that it is possible to hear if it is only a sound, display indicating that it is allowed to speak in the case of an emergency case, display indicating that it is possible to respond immediately, or display indicating that the user will contact later by speaking. Accordingly, the convenience of the surrounding people can be improved.

Further, the external notification control unit 132 may cause the notification indicating the response state of the information processing system to be displayed while the detecting unit 122 is detecting a person looking in the direction of the user A. For example, the external notification control unit 132 may cause a light source such as an LED installed in the display device 50 or the headphone device 30 to blink in order to give a notification that the detecting unit 122 is detecting a person looking in the direction of the user A to the surrounding person. Further, in a case in which the detecting unit 122 detects the motion of the surrounding person speaking to the user A and causes the storage unit 114 to start the recording of the received image information and the sound information, the external notification control unit 132 may cause an indicator indicating that video recording or sound recording is in progress to be blinked. Further, while the image information or the sound information is being recorded, the external notification control unit 132 may cause the display to be changed in accordance with the magnitude of the collected sound. For example, in accordance with the sound level, the external notification control unit 132 may cause the display to blink or cause the display to be changed using an animation.

Further, the external notification control unit 132 may cause the external notifying unit 56 to display the state of the user A. For example, the external notification control unit 132 may cause the status of the user A to be displayed on the basis of biometric information detected by a biosensor or the like attached to the user A. For example, the biometric sensor is a sensor capable of detecting a heart rate, a perspiration state, a brain wave, or the like of the user A, and the detected biological information can be read by the information processing device 110.

Figure 20:
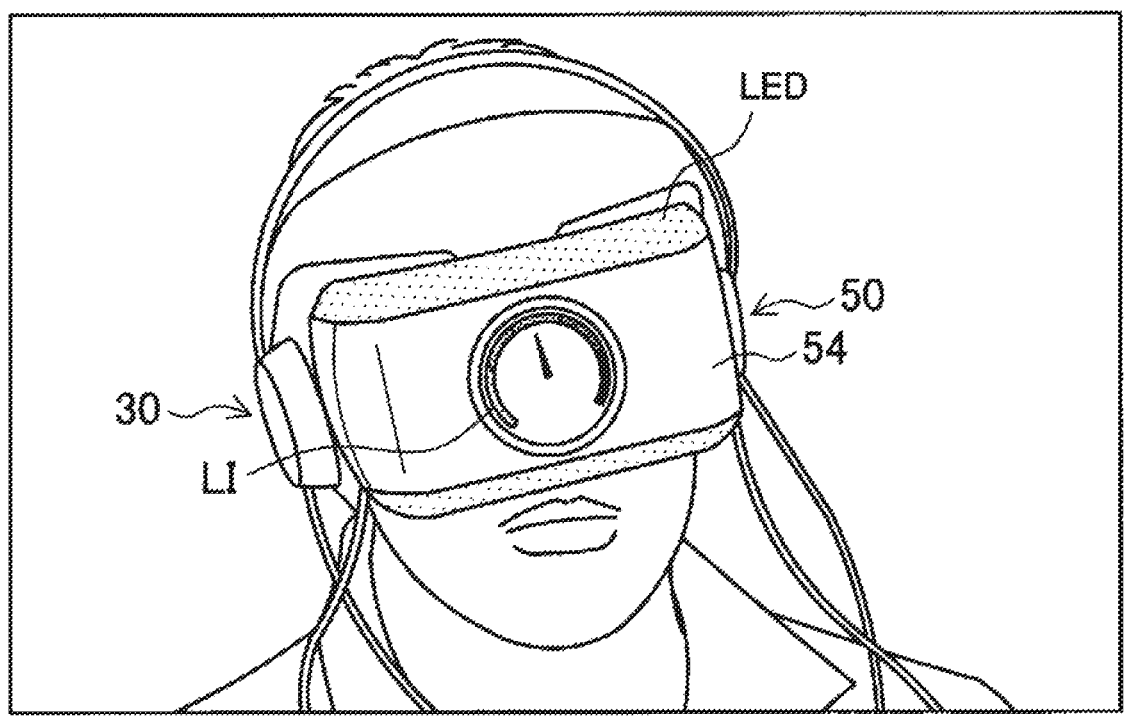
FIG. 20 is an explanatory diagram illustrating an example of notifying a surrounding person of a state of the user.

FIG. 20 illustrates an example in which the state of the user A is displayed on the external notifying unit 56 of the display device 50 of the HMD device 100 by the external notification control unit 132. For example, the external notification control unit 132 may cause brightness of an LED display LD of the external notifying unit 56 to be reduced in a case in which the user A is determined to be sleeping on the basis of information such as a brain wave. Further, the external notification control unit 132 may estimate the degree of concentration of the user A on the basis of the biometric information and cause the external notifying unit 56 to display a level meter LI.

Further, in a case in which the user A is detected to lose consciousness on the basis of the biological information, the external notification control unit 132 may cause a warning sound with a loud volume or the like to be output from a sound output unit or the like installed in the HMD device 100 or the headphone device 30 or may cause all the light sources to be blinked. Accordingly, it is possible for surrounding people to easily notice the abnormality of the user A.

The external notification control unit 132 may cause a portion or a device for performing the notification display to be changed depending on the position information of the surrounding person or the speaking person when the notification display is performed. For example, the external notification control unit 132 may cause a portion or a device for performing the notification display to be changed so that the display is performed in the direction in which the surrounding person or the speaking person is positioned.

Further, the external notification control unit 132 may cause a portion or a device for performing the notification display or the display content to be changed on the basis of the attribute information of the surrounding person or the speaking person. For example, the external notification control unit 132 may cause the display position to be changed in accordance with a height of a person.

Alternatively, the external notification control unit 132 may cause the display content to be changed in accordance with an age group of a person, a relationship with the user A, a specific person, or the like. Accordingly, it is possible to perform the notification display to be easily viewed by the surrounding people or not to make the surrounding people uncomfortable.

As described above, according to the second modified example of the present embodiment, the external notification control unit 132 causes the external notifying unit 56 to display a notification indicating whether or not the user A is allowed to be spoken to, the response state of the information processing system, or the state of the user A. Accordingly, the convenience and comfort of the person near the user A can be increased. Further, when such a notification is displayed, it is possible to draw attention of a person who is near the user A but has no intention to speak to the user A.

1-6-3. Third Modified Example

As a third modified example of the present embodiment, the information processing device 110 may detect the presence or absence of interest in the user A on the basis of a motion of a person instead of the line-of-sight direction or the face direction of the person near the user A. Specifically, the detecting unit 122 may specify a person who is interested in the user A on the basis of the behavior of the person near the user A and further detect the motion of the person speaking to the user A when the person is determined to speak.

Examples of a behavior for determining the presence or absence of interest in the user A includes a behavior of approaching the user A or a behavior of taking a specific gesture. The specific gesture may be a gesture indicating an intention to speak to the user A such as a gesture of stretching the arm to the user A or a gesture of waving the hand. The detecting unit 122 may detect the behavior of the persons on the basis of the image information transmitted from the imaging device 10.

As described above, according to the third modified example of the present embodiment, the detecting unit 122 detects the presence or absence of interest in the user A on the basis of the behavior of the person near the user A and detect the motion of the person speaking to the user A when the person is determined to speak. Accordingly, even in a case in which the person speaks to the user A while not facing the user A, the detecting unit 122 can detect the speaking motion. Therefore, it is possible to reduce the possibility that the person speaking to the user A becomes uncomfortable due to the lack of response from the user A and improve the communication with the user A and the person speaking to the user A.

1-6-4. Fourth Modified Example

As a fourth modified example of the present embodiment, the information processing device 110 may detect the face direction of the user A on the basis of the image information captured by an imaging device worn on the head or the like of the surrounding people instead of the line-of-sight direction of the person near the user A. Specifically, in a case in which the user A is included in the image information captured by the imaging device worn on the surrounding person, the detecting unit 122 may determine that the face of the person is directed in the direction of the user A and detect the speaking motion of the person when the person is determined to speak.

Figure 21:
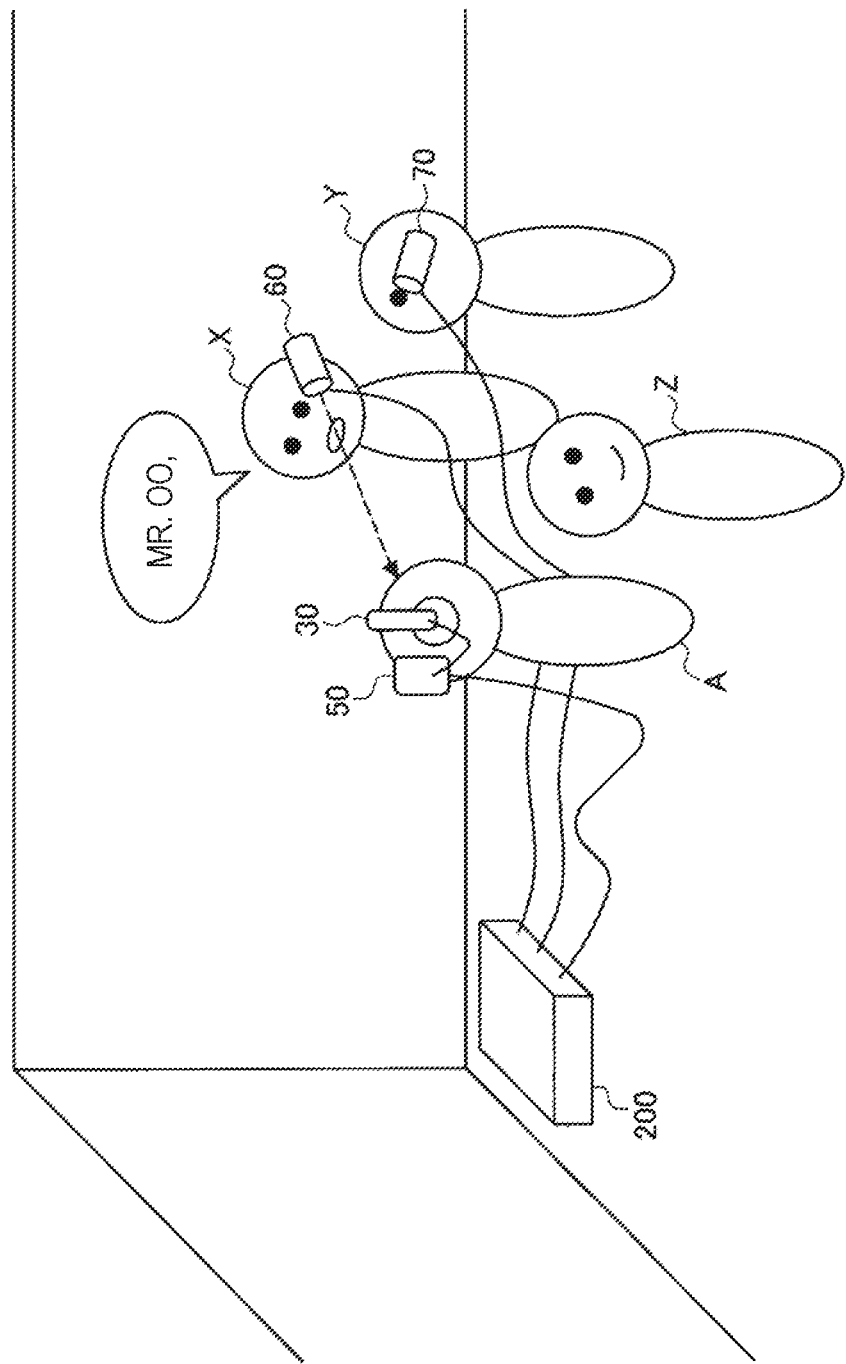
FIG. 21 is an explanatory diagram illustrating a use state of an information processing system according to a fourth modified example of the embodiment.

FIG. 21 is an explanatory diagram illustrating a use state of an information processing system of the fourth modified example. In the information processing system, the image information around the user A is monitored by head mounted type imaging devices 60A, 60B, and 60C worn on persons X, Y, and Z located in a space in which the user A wearing the immersive sensory device is located. Further, even in the information processing system, the sound information collected by the sound collecting unit 32 installed in the headphone device 30 or the like used by the user A is monitored.

In the information processing device 110 of the fourth modified example, the image information captured by the head mounted type imaging devices 60A, 60B, and 60C worn on the respective persons X, Y, and Z is used to determine whether or not the persons X, Y, and Z near the user A face in the direction of user A. Then, when an utterance of the person X wearing the imaging device 60A which has transmitted the image information including the user A is detected, the information processing device 110 detects the motion of the person X speaking to the user A. In a case in which the motion of the person X speaking to the user A is detected, the information processing device 110 specifies the speaking motion information on the basis of the received image information and the sound information and gives a notification indicating that the user A is being spoken to to the user A on the basis of the speaking motion information.

Figure 22:
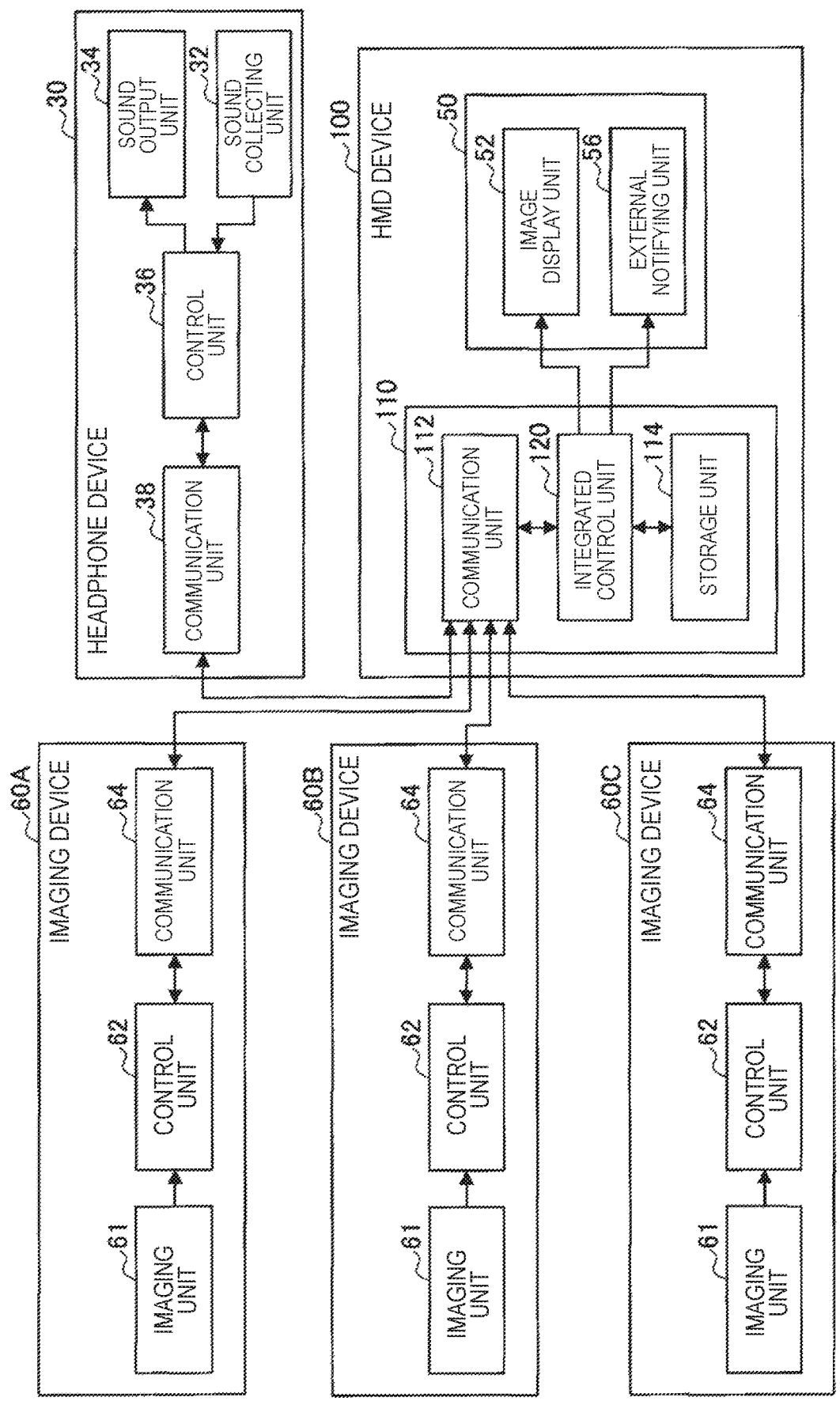
FIG. 22 is a functional block diagram illustrating an example of a configuration of the information processing system according to the fourth modified example of the embodiment.

FIG. 22 is a functional block diagram illustrating an example of a configuration of the information processing system of the fourth modified example. Such the information processing system includes the head mounted type imaging devices 60A, 60B, and 60C, the headphone device 30, and the HMD device 100. The imaging devices 60A, 60B, and 60C have similar configurations to that of the imaging device 10 except that the number of imaging units 61 of each of the imaging devices 60A, 60B, and 60C is one, and the function of generating the line-of-sight information by a control unit 62 may be omitted. Further, a basic functional configuration of the information processing device 110 is illustrated in the functional block diagram illustrated in FIG. 3.

In the fourth modified example, the detecting unit 122 detects the motion of the person near the user A speaking to the user A on the basis of the image information captured by the imaging devices 60A, 60B, and 60C and the sound information collected by the sound collecting unit 32. For example, in a case in which the user A is included in the image information captured by the imaging device 60A, the detecting unit 122 may determine that the face of the person X wearing the imaging device 60A is directed in the direction of the user A on the basis of the received image information. Further, the detecting unit 122 may detect the motion of the person X speaking to the user A in a case in which the person X is determined to speak.

The detecting unit 122 may determine whether or not the user A is included in the received image information, for example, by determining whether or not the person wearing the display device 50 or the headphone device 30 of the HMD device 100 is shown by image processing. Alternatively, an identification mark or the like may be formed on a part of the display device 50 or the headphone device 30 of the HMD device 100, and the detecting unit 122 may determine that the user A is included in a case in which the identification mark is detected in the image information.

As described above, according to the fourth modification example of the present embodiment, the detecting unit 122 detects that the face of the person X is directed in the direction of the user A on the basis of the image information captured by the imaging devices 60A, 60B, and 60C worn on the persons X, Y, and Z near the user A. Further, in a case in which the person X is determined to speak, the detecting unit 122 detects the motion of the person X speaking to the user A. Accordingly, the detecting unit 122 can detect the speaking motion without performing the process of generating the line-of-sight information.

2. Second Embodiment

As a second embodiment of the present disclosure, an example to which the present technology is applied in a state in which the user is visually or audibly restricted from the surroundings even in a case in which the user does not wear the immersive sensory device such as the HMD device or the headphone device will be described.

When the user A enters the inside of a closed space, the field of view for the surroundings or the sound given from the surroundings may be restricted even in a case in which the user does not wear the immersive sensory device such as the HMD device or the headphone device. For example, inside a soundproof room used in a case in which a behavior associated with a loud volume such as a behavior of practicing a musical instrument or singing a song is performed, the user may be visually and audibly restricted from external information. Further, inside an oxygen capsule device used for fatigue recovery or health promotion, the user may be visually and audibly restricted from the external information. Further, in recent years, even in electric vehicles or the like, moving objects in which internal occupants may be visually and audibly restricted from the external information have been developed.

In a case in which a person outside the closed space speaks to the user A inside the closed space, since the user A does not notice that the person speaks to the user A, it is difficult to secure communication. The information processing system including the information processing device of the present disclosure can also be used to improve communication between the user A inside the closed space and the person outside the closed space.

Figure 23:
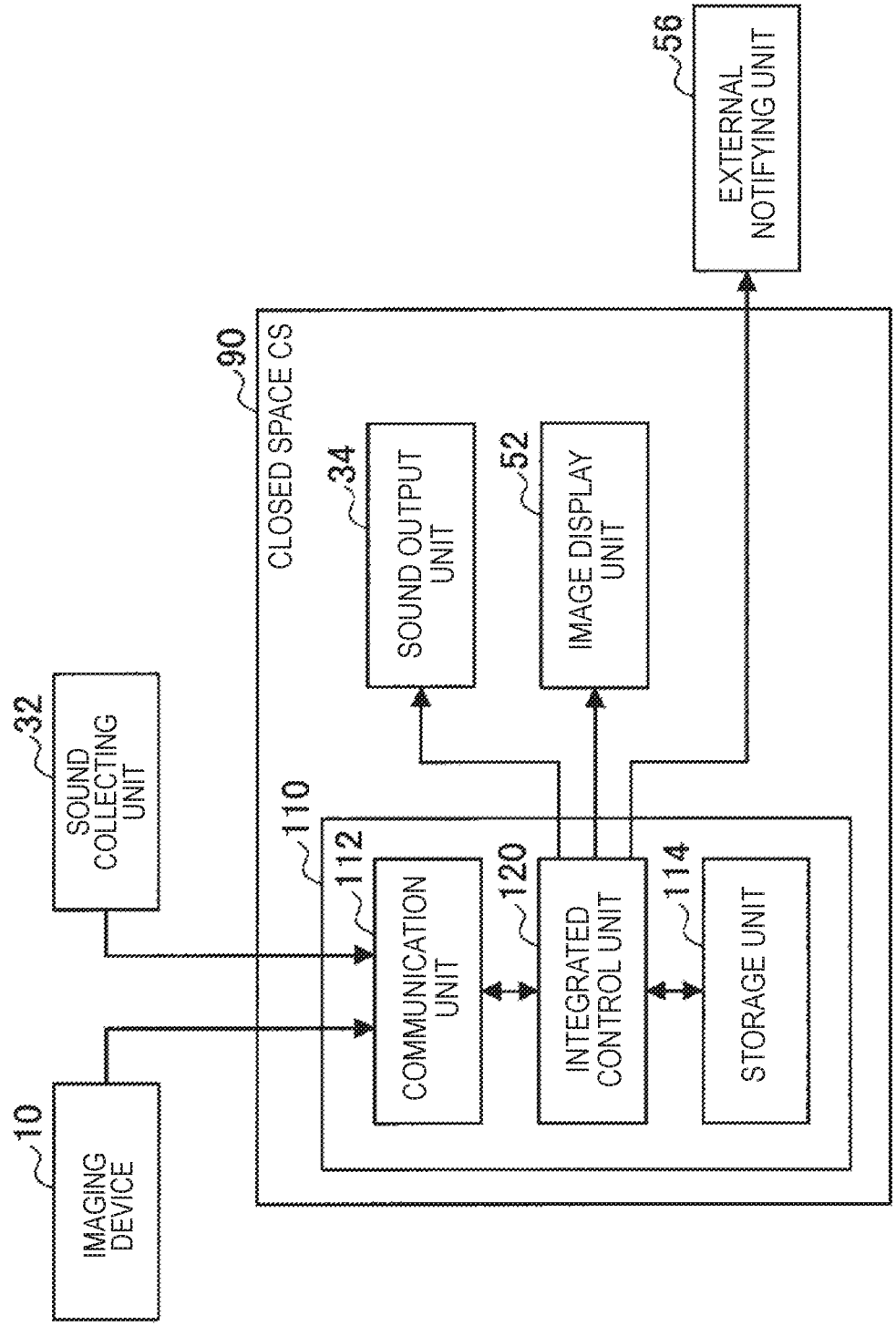
FIG. 23 is a functional block diagram illustrating an example of a configuration of an information processing system according to a second embodiment.

FIG. 23 is a functional block diagram illustrating an example of a configuration of the information processing system according to the present embodiment. The information processing system according to the present embodiment can be constituted by similar components to those of the information processing system pertaining to the first embodiment. Further, functions of the respective component can be similar to those of the information processing system according to the first embodiment.

Among the components, the imaging device 10 is installed at a position at which the outside of the closed space CS can be imaged. The imaging device 10 may be attached to a closed space constituent body 90 or may be installed at any one position in the space in which the closed space constituent body 90 is located. The sound collecting unit 32 is installed at a position at which the sound outside the closed space CS can be collected. The number of sound collecting units 32 is not limited to one. The image display unit 52 and the sound output unit 34 are installed inside the closed space constituent body 90. The image display unit 52 may be a display device of an HMD device or a display device such as a display panel or a projection type display device. The sound output unit 34 may be a headphone device or an earphone device or may be a speaker device. The external notifying unit 56 is installed at a position at which it is visible from the outside of the closed space CS. The external notifying unit 56 may be attached to the closed space constituent body 90 or may be installed at any one position in the space in which the closed space constituent body 90 is located. The position of the information processing device 110 is not particularly limited as long as transmission and reception of information can be performed with the entire system.

Even in the information processing system according to the present embodiment, the information processing device 110 performs the process of detecting the motion of the person outside the closed space CS speaking to the user A on the basis of the received line-of-sight information, the surrounding image information, or the surrounding sound information. Further, in a case in which the speaking motion to the user A in the closed space CS is detected, the information processing device 110 specifies the speaking motion information from the surrounding information being monitored and performs various kinds of processes of giving a notification indicating that the user A is spoken to to the user A. As specific processing content of the information processing device 110, various kinds of processing content described in the first embodiment can be applied.

Further, in the information processing system according to the present embodiment, for example, in a case in which a part of the closed space constituent body 90 is constituted by an instantaneous light control glass, when the speaking motion from the outside is detected, the internal notification control unit 126 of the information processing device 110 may cause the instantaneous light control glass to enter the transmission state and give a notification indicating that the user A of the inside is spoken to. Further, in the information processing system according to the present embodiment, the internal notification control unit 126 may cause a video outside of an inner wall surface or the like of the closed space constituent body 90 to be displayed on the wall. Further, in the information processing system according to the present embodiment, in a case in which the closed space constituent body 90 includes a plurality of windows, a display for inducing the internal line of sight of the user A to a window in a direction in which the speaking person of the outside is located may be performed on other windows, an inner wall surface, or the like.

As described above, even in the information processing system according to the present embodiment, the information processing device 110 can detect the motion of the person outside the closed space CS speaking to the user A in the closed space CS and specify the speaking motion information. Further, the information processing device 110 performs the notification process to the user A in the closed space CS on the basis of the specified speaking motion information. Accordingly, the user A of the inside can understand a situation in which the user A is spoken to. Therefore, the user A can determine Whether or not the response is necessary or how the response is performed in accordance with the speaking state of the person X of the outside, and thus the communication between the user A and the person X speaking to the user A can be improved.

3. Third Embodiment

As a third aspect related to the present disclosure, an example to which the present technology is applied in a state in which the user A is not placed in a completely closed space as in the application example of the second embodiment, but the user is placed in a space in which the outside can be viewed limitedly (hereinafter also referred to as a "semi-closed space") will be described.

For example, in a case in which learning or a work is performed in a space in which the surroundings are entirely or partially divided by partitions, or the like, the external information may be visually or audibly restricted depending on the direction in which the user A faces although a part of a side or an upper part is not spatially blocked. Further, there are cases in which the side of the user is not spatially blocked, but the front or the upper portion of the user is partially blocked, and the external information is visually or audibly restricted as in a training machine or a passenger simulation machine.

In a case in which a person outside of a semi-closed space speaks to the user A in the semi-closed space, it may be difficult for the user A to notice that the user A is spoken to and secure the communication depending on the direction in which the user A faces. The information processing system including the information processing device of the present disclosure can also be used to improve the communication between the user A inside the semi-closed space and the person outside the semi-closed space.

A configuration of the information processing system according to the present embodiment may be similar to that of the information processing system illustrated in FIG. 23. However, in the present embodiment, the imaging device 10 that images the outside of the semi-closed space and the sound collecting unit 32 that collects the external surrounding sound may be installed in a direction in which it is spatially blocked when viewed from the user A.

Even in the information processing system according to the present embodiment, the information processing device 110 performs the process of the motion of the person outside the semi-closed space (CS) speaking to the user A on the basis of the received line-of-sight information, the surrounding image information, or the surrounding sound information. Further, in a case in which the speaking motion to the user A in the semi-closed space (CS) is detected, the information processing device 110 specifies the speaking motion information from the surrounding information being monitored and performs various kinds of processes of giving a notification indicating that the user A is spoken to to the user A. As specific processing content of the information processing device 110, various kinds of processing content described in the first embodiment can be applied.

Further, in the information processing system according to the present embodiment, as in the case of the information processing system according to the second embodiment, the notification operation using the instantaneous light control glass, the external video display, or the display for inducing the line of sight of the user A may be performed. Further, the information processing system according to the present embodiment may detect the line of sight of the user A inside the semi-closed space, and in a case in which the user A is determined to face in the direction in which the speaking person of the outside is located, the information processing device 110 may not display the visual notification display.

Further, in the information processing system according to the present embodiment, in a case in which the user A uses the sound output unit 34, the information processing device 110 may determine whether or not the user A can directly hear the sound associated with the speaking from the outside on the basis of information such as a directional characteristic of a sound wave output from the sound output unit 34, a volume, or the position of the head of the user A. Then, the information processing device 110 may cause the notification using the sound output to be given only in a case in which it is determined that it is hard for the user A to directly hear the sound associated with the speaking from the outside. The information processing device 110 may not only turn on/off the sound output but also adjust the volume of the notification sound.

As described above, even in the information processing system according to the present embodiment, the information processing device 110 can detects the motion of the person outside the semi-closed space speaking to the user A inside the semi-closed space and specify the speaking motion information. Further, the information processing device 110 performs the notification process to the user A inside the semi-closed space on the basis of the specified speaking motion information. Accordingly, the user A of the inside can understand a situation in which the user A is spoken to. Therefore, the user A can determine whether or not the response is necessary or how the response is performed in accordance with the speaking state of the person X of the outside, and thus the communication between the user A and the person X speaking to the user A can be improved.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the first embodiment, the example in which the HMD device 100 and the headphone device 30 are employed as the immersive sensory device has been described, but the technology of the present disclosure is not limited to this example. For example, the present technology can be applied even in a case in which a head mounted type device that directly transmits a signal of viewing information to the brain and is able to implement the virtual reality is used as the immersive sensory device. In this case, the information processing device 110 can also improve the communication between the user A and the person speaking to the user A by executing the processes described in the first embodiment.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below (1)

An information processing device, including:

a detecting unit configured to detect a speaking motion of a surrounding person speaking to a user using a device that auditorily or visually restricts information from surroundings; and a specifying unit configured to specify speaking motion information indicating the speaking motion on a basis of monitored surrounding information in a case in which the speaking motion is detected.

(2)

The information processing device according to (1), in which the monitored surrounding information includes information of at least one of sound information and image information.

(3)

The information processing device according to (1) or (2), including an internal notification control unit configured to control a notification to the user on a basis of the specified speaking motion information.

(4)

The information processing device according to (3), in which the internal notification control unit performs time shift reproduction on information of at least one of sound information and image information serving as the specified speaking motion information.

(5)

The information processing device according to (4), in which the internal notification control unit gradually reduces a delay time caused by the time shift reproduction and performs switching to a real time sound output or image display.

(6)

The information processing device according to any one of (3) to (5), in which the internal notification control unit acquires position information of a person who makes the speaking motion, and controls a notification to the user on a basis of the position information together with the speaking motion information.

(7)

The information processing device according to (6), in which the internal notification control unit acquires position information of a person who makes the speaking motion, and causes the sound information to be output on a basis of the position information.

(8)

The information processing device according to (6) or (7), in which the internal notification control unit causes an image display unit to display a map on a basis of the position information.

(9)

The information processing device according to any one of (3) to (8), in which the internal notification control unit decreases a volume of content sound being used by the user and then causes sound information serving as the specified speaking motion information to be output.

(10)

The information processing device according to any one of (3) to (9), in which the device includes a headphone device or an earphone device having a noise cancellation function, and the internal notification control unit suppresses or stops the noise cancellation function and then causes sound information serving as the specified speaking motion information to be output.

(11)

The information processing device according to any one of (3) to (10), in which the internal notification control unit stops content being used by the user and then causes a notification to be given to the user.

(12)

The information processing device according to (11), in which the internal notification control unit causes a notice operation to be performed before stopping the content.

(13)

The information processing device according to any one of (3) to (12), in which the internal notification control unit causes a surrounding image to be superimposed and displayed on a content image being used by the user.

(14)

The information processing device according one of including an external notification control unit configured to give a notification indicating a permission state of the notification control to the user, to the surrounding person.

(15)

The information processing device according to (14), in which the external notification control unit causes the notification indicating the permission state of the notification control to the user to be given when a person facing in a direction of the user is detected.

(16)

The information processing device according to (14) or (15), in which the external notification control unit causes a notification indicating a recording state of a sound or a recoding state of an image associated with the speaking motion to be given to the surrounding person.

(17)

The information processing device according to any one of (1) to (16), including a history generating unit configured to generate speaking history information on a basis of the specified speaking motion information.

(18)

The information processing device according to (17), in which the speaking history information includes information of at least one of a speaking time, content used at a time of speaking, a person who makes the speaking motion, utterance content at the time of speaking, and a prohibition state of the notification control to the user.

(19)

An information processing method, including:

detecting a speaking motion of a surrounding person speaking to a user using a device that auditorily or visually restricts information from surroundings; and specifying speaking motion information indicating the speaking motion on a basis of monitored surrounding information in a case in which the speaking motion is detected.

(20)

A program causing a computer to execute:

a function of detecting a speaking motion of a surrounding person speaking to a user using a device that auditorily or visually restricts information from surroundings; and a function of specifying speaking motion information indicating the speaking motion on a basis of monitored surrounding information in a case in which the speaking motion is detected.

REFERENCE SIGNS LIST 10 imaging device
30 headphone device
32 sound collecting unit
34 sound output unit
50 display device
52 image display unit
56 external notifying unit
60A, 60B, 60C head mounted type imaging device
100 HMD device
110 information processing device
120 integrated control unit

The invention claimed is:

1. An information processing device, comprising:
a detecting unit configured to detect each speaking motion of a surrounding person speaking near a user using a wearable display device that auditorily and visually restricts information from surroundings;
a specifying unit configured to specify sound information of the surrounding person corresponding to each speaking motion based on monitored surrounding information in a case in which the speaking motion is detected;
a history generating unit configured to generate speaking history information based on the monitored surrounding information over time; and
an internal notification control unit configured to control the wearable display device to
display a single text message corresponding to a continuously received piece of the specified sound information according to a first operation, and
display a list of the speaking history information including a plurality of text messages corresponding to a plurality of pieces of the specified sound information according to a second operation,
wherein the detecting unit, the specifying unit, the history generating unit, and the internal notification control unit are each implemented via at least one processor.

2. The information processing device according to claim 1,
   wherein the specifying unit is further configured to specify image information based on the monitored surrounding information in the case in which the speaking motion is detected.

3. The information processing device according to claim 1,
   wherein the internal notification control unit is further configured to control a notification to the user based on the monitored surrounding information.

4. The information processing device according to claim 3,
   wherein the internal notification control unit is further configured to control the notification to the user by performing time shift reproduction on the sound information.

5. The information processing device according to claim 4,
   wherein the internal notification control unit controls the notification to the user by gradually reducing a delay time caused by the time shift reproduction and performing switching to a real time sound output.

6. The information processing device according to claim 3,
   wherein the internal notification control unit is further configured to acquire position information of the surrounding person corresponding to the speaking motion based on the monitored surrounding information, and
   wherein the internal notification control unit controls the notification to the user based on the acquired position information together with the speaking motion information.

7. The information processing device according to claim 6,
   wherein the internal notification control unit controls the notification to the user by causing the sound information to be output based on the acquired position information of the surrounding person.

8. The information processing device according to claim 6,
   wherein the internal notification control unit controls the notification to the user by causing the wearable display device to display a map based on the acquired position information of the surrounding person.

9. The information processing device according to claim 3,
   wherein the internal notification control unit controls the notification to the user by decreasing a volume of content sound being used by the user and then causing the sound information to be output.

10. The information processing device according to claim 3,
    wherein the wearable display device includes a headphone device or an earphone device having a noise cancellation function, and
    wherein the internal notification control unit controls the notification to the user by suppressing or stopping the noise cancellation function and then causing the sound information to be output.

11. The information processing device according to claim 3,
    wherein the internal notification control unit controls the notification to the user by stopping content being used by the user and then causing the notification to be given to the user.

12. The information processing device according to claim 11,
    wherein the internal notification control unit controls the notification to the user by causing a notice operation to be performed before stopping the content.

13. The information processing device according to claim 3,
    wherein the internal notification control unit controls the notification to the user by causing image information including an image of the surrounding person to be superimposed and displayed on a content image being used by the user.

14. The information processing device according to claim 3, further comprising:
    an external notification control unit configured to cause an external notification to be given to the surrounding person indicating a permission state of the notification control to the user,
    wherein the external notification control unit is implemented via at least one processor.

15. The information processing device according to claim 14,
    wherein the external notification control unit causes the external notification indicating the permission state of the notification control to the user to be given to the surrounding person only when it is detected that the surrounding person is facing in a direction of the user.

16. The information processing device according to claim 14,
    wherein the external notification control unit causes the external notification to indicate at least one of a recording state of the sound information or a recording state of image information associated with the speaking motion to be given to the surrounding person.

17. The information processing device according to claim 1,
    wherein the speaking history information includes information of at least one of a speaking time of each surrounding person, content used by the user at a time of speaking, an identification of each surrounding person who makes the speaking motion, utterance content of each surrounding person at the time of speaking, or a prohibition state of the notification control to the user.

18. The information processing device according to claim 1,
    wherein the specifying unit is further configured to specify position information of the surrounding person corresponding to the speaking motion based on the monitored surrounding information in the case in which the speaking motion is detected, and
    wherein the specified position information of the surrounding person comprises a distance between the surrounding person and the user.

19. The information processing device according to claim 1, further comprising:
    a storage unit configured to store preset message data,
    wherein the specifying unit is further configured to specify position information of the surrounding person corresponding to the speaking motion based on the monitored surrounding information in the case in which the speaking motion is detected, and
    wherein the internal notification control unit controls the wearable display device to display the text message according to the specified position information and the stored preset message data.

20. The information processing device according to claim 1,
  wherein the specifying unit is further configured to convert a voice recognition result of an utterance included in the sound information into text, and
  wherein the internal notification control unit controls the wearable display device to display the text message by indicating the text corresponding to the utterance.

21. The information processing device according to claim 1,
  wherein the speaking history information further includes an identification of the surrounding person corresponding to each piece of the plurality of pieces of the specified sound information.

22. The information processing device according to claim 21,
  wherein the speaking history information further includes at least one of a speaking time of each surrounding person or content used by the user at a time of speaking.

23. An information processing method, executed via at least one processor, the method comprising:
  detecting each speaking motion of a surrounding person speaking near a user using a wearable display device that auditorily and visually restricts information from surroundings;
  specifying sound information of the surrounding person corresponding to each speaking motion based on monitored surrounding information in a case in which the speaking motion is detected;
  generating speaking history information based on the monitored surrounding information over time; and
  controlling the wearable display device to
    display a single text message corresponding to a continuously received piece of the specified sound information according to a first operation, and
    display a list of the speaking history information including a plurality of text messages corresponding to a plurality of pieces of the specified sound information according to a second operation.

24. A non-transitory computer-readable medium having embodied thereon a program, which when executed by a computer causes the computer to execute a method, the method comprising:
  detecting a speaking motion of a surrounding person speaking near a user using a wearable display device that auditorily and visually restricts information from surroundings;
  specifying sound information of the surrounding person corresponding to the speaking motion based on monitored surrounding information in a case in which the speaking motion is detected;
  generating speaking history information based on the monitored surrounding information over time; and
  controlling the wearable display device to
    display a single text message corresponding to a continuously received piece of the specified sound information according to a first operation, and
    display a list of the speaking history information including a plurality of text messages corresponding to a plurality of pieces of the specified sound information according to a second operation.

* * * * *